United States Patent [19]
Rosen et al.

[11] Patent Number: 5,850,436
[45] Date of Patent: Dec. 15, 1998

[54] COMMUNICATION BETWEEN A TELEPHONE AND A COMPUTER SYSTEM

[75] Inventors: P. Bradley Rosen, Weston, Mass.; Lee D. Weinstein, Somerville; Michael A. Bromberg, Mason, both of N.H.; Glen R. Dash, Concord, Mass.

[73] Assignee: Compaq Computer Corporation, Houston, Tex.

[21] Appl. No.: 702,151

[22] Filed: Aug. 23, 1996

[51] Int. Cl.[6] .................................................. H04M 9/02
[52] U.S. Cl. .................. 379/377; 379/93.01; 379/212; 379/350; 379/399
[58] Field of Search ................................ 379/377, 93.09, 379/67, 93.01, 88, 100.16, 162, 211, 212, 350, 373, 89, 379, 112; 455/402, 400

[56] References Cited

U.S. PATENT DOCUMENTS

| | | | |
|---|---|---|---|
| 4,588,856 | 5/1986 | Cohen | 379/93.05 |
| 4,686,699 | 8/1987 | Wilkie | 379/93.05 |
| 5,367,563 | 11/1994 | Sainton | 379/93.05 |
| 5,369,687 | 11/1994 | Farkas | 379/93.05 |
| 5,392,334 | 2/1995 | O'Mahony | 379/88 |
| 5,471,522 | 11/1995 | Sells et al. | 379/93.11 |
| 5,594,788 | 1/1997 | Lin et al. | 379/377 |

*Primary Examiner*—Krista Zele
*Assistant Examiner*—Jacques Saint-Surin
*Attorney, Agent, or Firm*—Paul N. Katz

[57] ABSTRACT

A method and apparatus provide communication in a telephone system connected to an external phone line, wherein the telephone system has a telephone line, a telephone, a phone interface unit coupled to the telephone and the telephone line, a computer system, and a computer interface unit coupled to the computer system and the telephone line. A bias voltage on the telephone line is detected to determine if the telephone is on-hook or off-hook, a ringing voltage on the telephone line is detected to determine if an external call is incoming, and a first carrier transmitted by the phone interface unit is detected. A second carrier is transmitted using the computer interface unit under control of the computer system. Detection of the bias voltage, ringing voltage, and/or first carrier is communicated to the computer system. An off-hook condition is indicated if the line bias voltage is less than an off-hook bias threshold voltage. An incoming ring is indicated if the ringing voltage has an amplitude greater than a first voltage and a frequency in the range of a ring frequency. The first carrier is indicated as being present if a signal is detected at a first carrier center frequency and having an amplitude greater than a first carrier threshold voltage. The second carrier is indicated as being present if a signal is detected at a second carrier center frequency and having an amplitude greater than a second carrier threshold voltage.

37 Claims, 21 Drawing Sheets

| HW_DEVICE METHOD | CIU CONTROL COMMANDS | EXPECTED ACKNOWLEDGE MESSAGE |
|---|---|---|
| ANSWERPOTS | PC_SEIZELINE | CIU_STATUS |
| HANGUPPOTS | PC_UNSEIZELINE | CIU_STATUS |
| ANSERHOMEWIRE | PC_HWCALLACK | CIU_STATUS |
| HANGUPHOMEWIRE | PC_DROPCIUCARRIER | CIU_STATUS |
| LISTEN | PC_SETMONITORMODE (ON) | CIU_STATUS |
| ENDLISTEN | PC_SETMONITORMODE (OFF) | CIU_STATUS |
| READRINGCOUNT | PC_GETRINGROLLOVER | CIU_RING_ROLLOVER_CURRENT |
| SETRINGCOUNT | PC_SETRINGROLLOVER | CIU_STATUS |

FIG. 18B

| ALERT/STATUS REPORTED BY CIU | NOTIFICATION FROM HW_DEVICE OBJECT TO TSP |
|---|---|
| CIU_STATUS (PIU_CARRIER_DETECTED) | HWRING |
| CIU-STATUS (NOT PIU_CARRIER_DETECTED) | HWCALLMISSED \| HWREMOTEDISCONNECT \| FLASHDETECT |
| CIU_STATUS (OFF-HOOK DETECTED) | POTSOFFHOOKDETECT |
| CIU_STATUS (NOT PARALLEL OFF-HOOK DETECT) | POTSONHOOKDETECT & HWREMOTEDISCONNECT |
| CIU_ALERT_INFO (RING AVAILABLE) | POTSRING (ALSO ISSUE PC_CLEAR_RING_TRIGGER) |
| CIU_ALERT_INFO (STATUS CHANGED) | NONE (ISSUE PC_GET_STATUS AND USE STATUS INFORMATION CIU_STATUS) |

FIG. 18C

COMMUNICATION BETWEEN A TELEPHONE AND A COMPUTER SYSTEM

BACKGROUND

The invention relates to communication between a telephone and a computer system.

Software and hardware are now available to enable computers to perform speech recognition. One application of speech recognition is in word processing, in which a user can draft a document by speaking into a microphone connected to the computer. Another application of speech recognition is in computerized telephone answering systems, in which a prerecorded message prompts a caller to select different options by speaking.

In a computerized answering system the caller can access the system by calling from a telephone using an outside phone line. When the caller picks up the telephone, the phone company detects that a telephone has been taken off-hook. Telephone line resources—including power, dual-tone multi-frequency (DTMF) or pulse dialing detectors, and call progress tone generators—are then dedicated to the now off-hook telephone.

The call from the outside line is initially forwarded to the answering system as a ring. The ring is detected, and to answer, the answering system seizes the line in response to which the phone company connects the caller to its destination. Once connected, the answering system can begin sending voice prompts to the caller, and the caller can select options offered by the system by speaking the desired selections. Voice data from the caller is then transmitted to a speech recognizer in the answering system over the telephone lines, and the answering system can then respond accordingly.

SUMMARY

In general, in one aspect, the invention features a method of communicating information in a telephone system connected to an external phone line. The telephone system features a telephone line, a telephone, a phone interface unit coupled to the telephone and the telephone line, a computer system, and a computer interface unit coupled to the computer system and the telephone line. A bias voltage is detected on the telephone line to determine if the telephone is on-hook or off-hook. A ringing voltage is detected on the telephone line to determine if an external call is present. A first carrier transmitted by the phone interface unit is detected. A second carrier is transmitted by the computer interface unit under control of the computer system. Detection of the bias voltage, ringing voltage, or first carrier, is communicated to the computer system.

Certain implementations of the invention may include one or more of the following features. The telephone is isolated from the telephone line using the phone interface unit if the second carrier is transmitted. The telephone is connected to the telephone line using the phone interface unit if the second carrier is not transmitted. The computer system is notified that the telephone is about to transmit voice data if the first carrier is detected. The computer system is notifed that the telephone is off-hook if the line bias voltage is detected. The computer system is notified that the telephone is on-hook if the line bias voltage is not detected. The computer system is notified of an external phone call event if the ringing voltage is detected on a telephone line. A flash-hook indication is activated on the telephone line if the line bias voltage is detected, then not detected for less than a predetermined period of time, then detected again. The computer system is notified of a flash-hook event if the flash-hook indication is detected. A communication software runs on the computer system. The bias voltage, the ringing voltage, or the first carrier is translated into a telephony application programming interface event that is posted to the communication software. The off-hook condition is detected if the line bias voltage is less than an off-hook bias voltage. An incoming ring is indicated if the ring voltage has an amplitude greater than a first voltage and a frequency within the range of a ring frequency. The first and second carriers are transmitted over the telephone line. Presence of the first carrier is indicated if a signal is detected having a first carrier center frequency and having an amplitude greater than a first carrier voltage. Presence of the second carrier is indicated if a signal is detected having a second carrier center frequency and having an amplitude greater than a second carrier voltage.

In general, in another aspect, the invention features a telephone system having a telephone line for connection to an external phone line. A telephone is coupled to the telephone line, and a phone interface unit is coupled to the telephone and the telephone line. A computer interface unit is coupled to a computer system. In addition, a first detector detects a bias voltage on the telephone line to determine if the telephone is on-hook or off-hook, a second detector detects a ringing voltage on the telephone line to determine if an external call is incoming, and a third detector detects a first carrier transmitted by the phone interface unit. The computer interface unit transmits a second carrier under control of the computer system. The computer interface unit communicates all of the detection of the bias voltage, ringing voltage, and first carrier to the computer system.

Certain implementations of the invention may include one or more of the following advantages. A communication protocol is defined to allow communication between a telephone and a computer system. The communication protocol can be defined without the need for additional cables or lines, which reduces hardware complexity and cost. The communication protocol allows voice communication between the telephone and the computer system without the telephone seizing an external phone line.

Other advantages and features will become apparent from the following description and from the claims.

BRIEF DESCRIPTION OF DRAWINGS

FIGS. 18B and 18C are tables showing the mapping of commands between the device object of FIG. 12 and the computer interface unit firmware of FIG. 9.

DESCRIPTION

TELEPHONE SYSTEM

Figure 1:
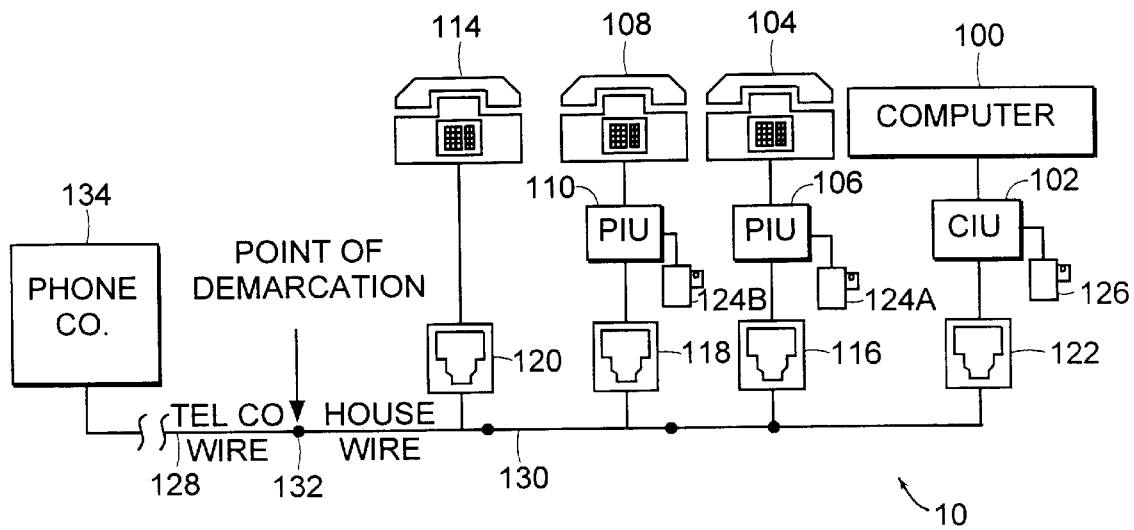
FIG. 1 is a block diagram of a telephone network in which telephones communicate with a computer system by radio frequency signals over an existing phone line.

Referring to FIG. 1, a telephone network 10 according to the present invention includes phone interface units (PIUs) 106 and 110 placed between telephones 104 and 108 (PIU-connected telephones) and wall jacks 116 and 118, respectively. A telephone 114 is connected directly to a wall jack 120 (a non-PIU telephone). A computer interface unit (CIU) 102 is connected between a computer system 100 and a wall jack 122. The wall jacks 116, 118, 120 and 122 can be standard RJ-11 telephone jacks. Each of the wall jacks 116, 118, 120 and 122 is connected to a local or internal telephone network line 130, which is connected to an external phone line 128 at a "point of demarcation" or a "network interface" 132, and ultimately to switching circuitry located at a telephone company central office 134. When an external phone call is in progress, each PIU behaves as a wire and connects its respective telephone to the telephone network line 130.

Internal communication can occur between one of the PIU-connected telephones and communication software running in the computer system 100. A user can issue commands, make inquiries, and access information simply by picking up the nearest telephone to access the computer system 100 remotely. The communication software, depending upon user selection, responds by either providing a voice greeting or, alternatively, causing the PIU to connect the telephone to the telephone network line 130 so that the user hears a dial tone. If the latter option is selected by the computer, then the user can perform a flash hook on the telephone (for example, hanging up the telephone for less than one second) to override the computer selected option, and the communication software will cause the PIU to disconnect the telephone from the line 130 and connect the telephone to the computer system 100. Once connected to the computer system 100, the user can issue voice commands by simply speaking. To switch the phone back to normal mode, the user can ask the computer for an outside line before dialing.

For example, a user might pick up a telephone and say: "Dial John Smith," to which the computer might respond with the statement: "At home or at work?" Other possible voice commands include: "Turn off all the lights in the house" or "close the garage door." The computer system 100 would recognize and comply with these requests by sending commands to a home automation and control network (not shown), such as the X10 System from Radio Shack, or a SmartHouse network.

In another example, the computer system 100 might be connected to a home security system. Upon waking, a parent might pick up a telephone to ask the computer system 100 the last time someone came home. Thus, depending upon the configuration desired by a user, the computer system 100 can be instructed to perform any number of tasks by recognizing voice commands over the internal telephone network.

In FIG. 1, communication between the PIU-connected telephones 104 and 108 and the computer system 100 is achieved through radio frequency (RF) communication between the PIUs 106 and 110 and the CIU 102 over the internal telephone network line 130. The phone company central office 134 monitors the DC current on the phone line to detect if a telephone has been taken off-hook. When a PIU-connected telephone is initially picked up, the PIU supplies power to the telephone instead of the phone company 134 and thus prevents the telephone from seizing the telephone network line 130. This effectively isolates the telephone from the external phone line 128, allowing the telephone to communicate with the CIU 102 by RF carrier signals sent over line 130. When the non-PIU telephone 114 is picked up, the CIU 102 turns off its carrier signal to force all telephones to revert to ordinary telephone operation.

Power can be provided to the PIUs by an RF power carrier generated by the CIU 102 and conducted over the telephone network line 130. The same RF carrier can be used to carry both the power and the voice data from the CIU 102 to the PIUs. Alternatively, the power for the PIUs may be provided over separate RF carriers. As the RF impedance of the telephone network line 130 may make it difficult to provide enough power to the PIUs while their associated telephones are in use, a rechargeable battery (not shown) can be included in each PIU. When no outside phone call is in progress, the CIU 102 provides a power carrier to charge the PIUs' batteries. If additional power is required, the PIUs 106 and 110 can optionally be equipped with an AC wall-cube adapters 124A and 124B, respectively. Power to the CIU 102 can be provided by plugging an AC wall-cube adapter 126 into an AC power outlet.

Installation of the system is very simple for a user. For each telephone to be equipped with a PIU, the user unplugs the telephone at the wall, plugs the PIU into the wall jack, and plugs the phone into the PIU. Telephones not connected to PIUs function normally. The user connects the CIU 102 to the computer system 100, to a power outlet through adapter 126, and to the wall jack 122. The CIU 102 is connected to the serial port of the computer system 100, with the communication between the CIU 102 and the computer system being according to a serial bus protocol. Alternatively, the CIU 102 can connect to the computer system 100 through an expansion bus slot, such as an Industry Standard Architecture (ISA) bus slot or an Extended Industry Standard Architecture (EISA) bus slot. Other ports of the computer system can also be used to connect to the CIU 102, such as the parallel port.

A number of requirements must be satisfied to communicate over the existing telephone network line 130 by RF.

First, noise and interfering sounds on the phone line must be quiet enough in comparison to the voice signal to allow the voice recognition software in the computer system 100 to operate reliably. Second, FCC regulations must be met. Finally, phone company resources must not be inappropriately utilized. These requirements are all satisfied by the internal telephone network according to the present invention.

Figure 4:
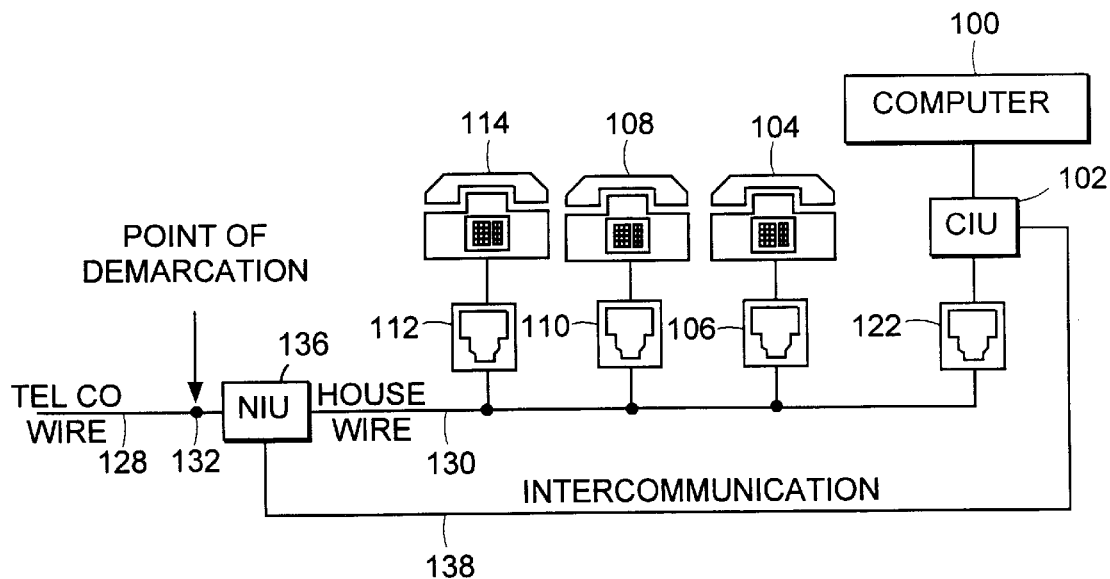
FIG. 4 is a block diagram of a telephone network system in which telephones communicate with a computer system over an internal phone line by baseband voice communication.

Referring to FIG. 4, an alternative embodiment of the invention provides that all the telephones 104, 108 and 114 are connected directly to the wall jacks 106, 110 and 112, respectively, in the normal telephone configuration. A network interface unit (NIU) 136 is installed at the point of demarcation 132. Power is supplied by the NIU 136 locally to the telephones 104, 108 and 114, and communication between the telephones and the computer system 100 occurs over the internal phone line 130 at baseband. A communication link 138 (which can be a wire link or a wireless electromagnetic link) between the computer system 100 and the NIU 136 allows the computer system 100 to "talk" to the telephones, or to switch the telephone network into "normal phone" mode by connecting the internal phone line 130 to the external phone line 128 through NIU 136.

Figure 2:
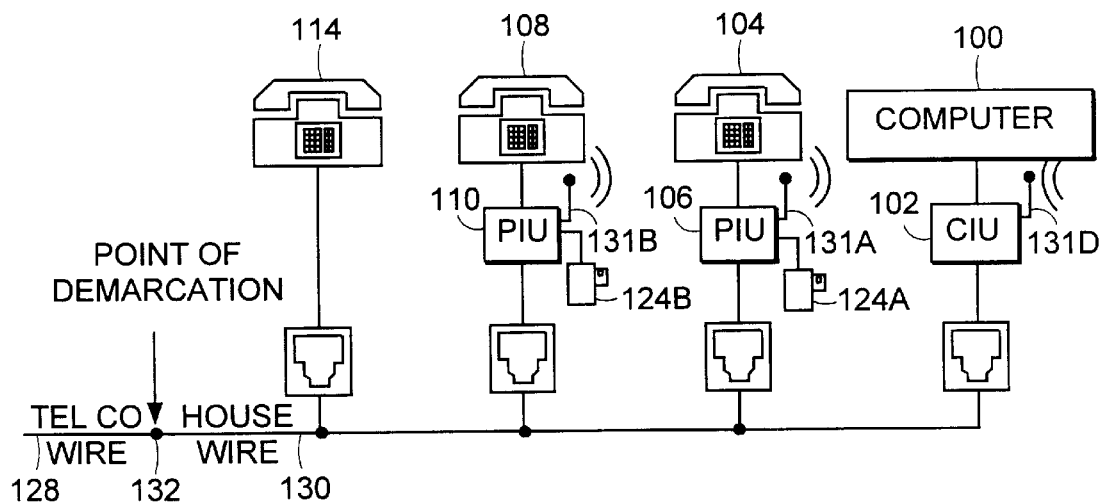
FIG. 2 is a block diagram of a telephone network system in which telephones communicate with a computer system by electromagnetic wave signals.

Referring to FIG. 2, another embodiment of the invention includes connecting the PIUs 106 and 110 between the telephones 104 and 108 and the telephone network line 130, but transmits the modulated information between each PIU and the CIU 102 electromagnetically (wireless) between transmitters 131A and 131B (connected to the PIUs) and a transmitter 131D (connected to the CIU 102).

Figure 3:
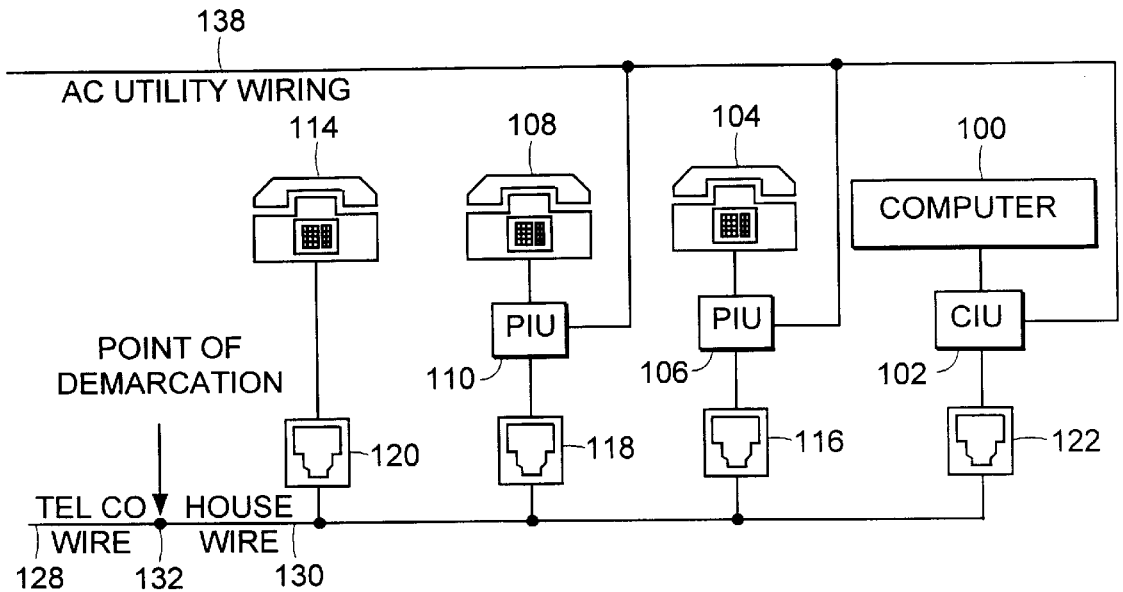
FIG. 3 is a block diagram of a telephone network system in which telephones communicate with a computer system by radio frequency signals sent over AC utility wiring.

Referring to FIG. 3, yet another embodiment of the invention includes connecting the PIUs 106 and 110 between the telephones 104 and 108 and the telephone network line 130, but transmits the modulated information from each PIU to the CIU 102 over AC utility wiring 138.

Referring again to FIG. 1, connecting a telephone through a PIU allows the telephone to operate in either of two modes. In a first mode, the PIU behaves as a wire and the telephone acts like a regular telephone connected to an outside line. This mode occurs either when power is not presented to the PIU, or when the CIU 102 stops sending its RF carrier.

In a second mode, the PIU and CIU act as a full-duplex RF voice interface between the computer system 100 and the user. In this mode, the telephone is isolated from the phone line 130 at baseband, and the phone company 134 detects that all the telephones connected to the internal telephone network are on-hook. In the second mode, the PIU receives voice communication over the CIU RF carrier from the CIU 102. The PIU sends voice communication to the CIU 102 over a second voice carrier (PIU RF carrier). The PIU RF carrier occupies a frequency band distinct from the frequency band used for the CIU RF carrier. Frequency modulation (FM) is used to place the voice signals in the selected frequency bands. Alternatively, other modulation methods, such as amplitude modulation (AM), can be used.

FCC regulations forbid sending voice-band signals over the phone lines while the phone company 134 thinks the phones are on-hook. To do so is considered leaked communication. Above 270 kHz, however, the FCC will allow signaling over phone lines up to 15 dBV (about 5 volts in amplitude). Frequency modulation is used to create two voice channels between 270 kHz and 495 kHz. Although not required by the FCC, 495 kHz is chosen as an upper limit to avoid potential interference with radio equipment. In a preferred embodiment, a channel centered at 310 kHz is used for voice communication from the computer system 100 to the user (CIU to PIU), and a channel centered at 485 kHz is used to send voice communication from the user to the computer system 100 (PIU to CIU). Each channel can be set to a bandwidth about 20 kHz.

Since the CIU 102 performs the line monitoring functions needed to determine when the PIU should be in mode 1 and when it should be in mode 2, the existence or lack of the CIU carrier is used to communicate this information to each PIU. When the PIU detects the presence of the CIU carrier, it isolates the phone from the phone line 130, and places the PIU in mode 2. If the CIU 102 detects a condition that requires all the telephones to be placed in mode 1, it shuts off the CIU carrier to place the PIUs in mode 1.

In the illustrated embodiment of the invention, in operation, when a PIU-connected telephone is picked up, the CIU 102 responds by shutting off the CIU RF carrier, after the first few milliseconds. The PIU is switched into mode 1 and behaves as a wire to allow the telephone to seize the line 130. The user then hears a dial tone. If the user wants to talk to the computer system 100, then the user issues a flash hook (for example, hitting the hang-up button for less than one second), and the communication software responds by causing the CIU 102 to re-transmit the CIU RF carrier to turn the PIU back on (that is, to mode 2). Once the PIU isolates the telephone from the telephone line 130, communication can occur between the user and the computer system 100.

The communication system has excellent isolation between houses. The phone lines are not designed to be efficient at the frequencies used for the PIU and CIU RF carriers. As a result, the RF carrier signal from one house becomes attenuated over the distances involved between two houses so that there is little danger of coupling with carrier signals in another house.

PHONE INTERFACE UNIT

Figure 5:
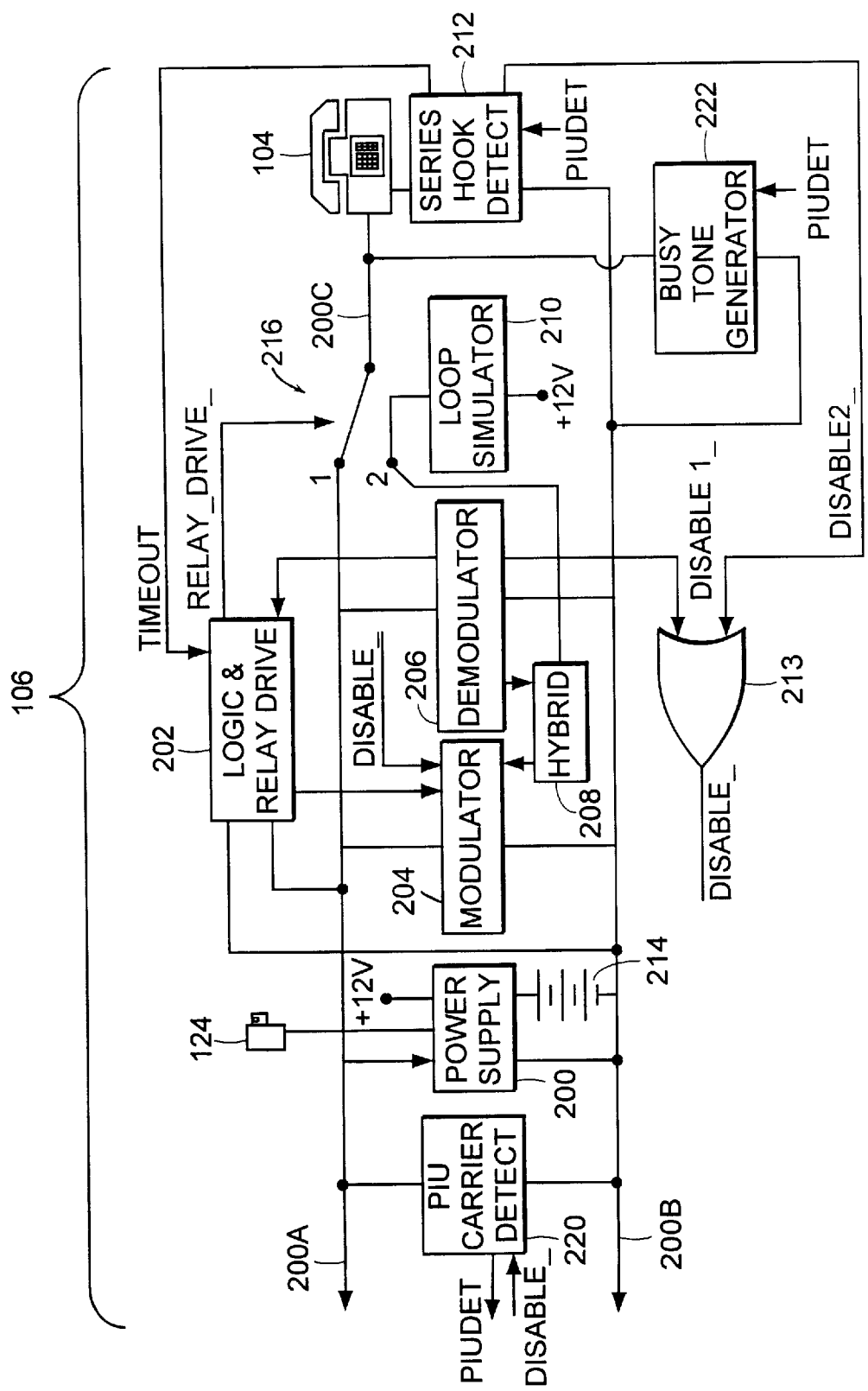
FIG. 5 is a block diagram of a phone interface unit connected to a telephone in the system of FIG. 1.

Referring to FIG. 5, the PIU 106 includes a power supply 200 which rectifies and regulates AC power supplied from the wall-cube adapter 124. The power supply 200 generates a +12V voltage signal. Alternatively, the power supply also rectifies an incoming CIU power carrier and extracts power from the carrier to charge a battery 214 while the telephone 104 is not in use. A relay switch 216 is controlled by a logic and relay drive 202, which in turn is controlled by a signal RELAY_DRIVE_ from a demodulator 206. When the signal RELAY_DRIVE_ is driven low by the demodulator (indicating that the demodulator 206 has detected a CIU RF carrier on lines 200A and 200B from the line 130), the switch 216 is flipped to position 2 to isolate the telephone 104 from the telephone line 130 (mode 2). In mode 2, the telephone 104 is connected to a hybrid 208. When the signal RELAY_DRIVE_ is deasserted high (when no CIU RF carrier is present or when power in the PIU is off), the logic and relay drive 202 places the relay switch 216 in position 1 (mode 1) to connect the telephone 104 to the line 200A.

When an internal PIU-CIU or mode 2 call (a Homewires call) is in progress, a modulator 204 (connected between lines 200A and 200B) receives a baseband voice signal from the telephone 104 through the hybrid 208. The modulator 204 uses the baseband voice signal to modulate a PIU RF carrier (for example, a 485-kHz carrier). The modulator 204 includes a voltage-controlled oscillator (VCO) for generating the RF signal. The modulator 204 couples the PIU RF carrier onto the telephone network line 130, at lines 200A, 200B.

The demodulator 206 (also connected between the lines 200A and 200B) receives a CIU RF carrier (for example, a 310-kHz carrier) and demodulates the voice information from the computer system 100 down to baseband for forwarding to the telephone 104 through the hybrid. The demodulator 206 includes carrier detect circuitry having a band-pass filter that selectively passes the CIU RF carrier. The carrier detect circuitry drives the signal RELAY_ DRIVE_, asserting it low if a CIU RF carrier is present. The carrier detect circuitry also provides a signal DISABLE1_ to an OR gate 213, whose output drives a signal DISABLE_ to the modulator 204. A signal DISABLE2_, provided to the other input of the OR gate 213, is driven high by a series hook detect block 212 when the telephone 104 is not off-hook, that is, no conversation is needed with the computer system 100. The DISABLE_ signal is driven low only if both the CIU carrier is present and the telephone is off-hook. If either the CIU carrier is not present or the telephone 104 is not off-hook, the signal DISABLE_ is driven high. If the signal DISABLE_ is asserted low, the output of the modulator 204 is tri-stated and placed into a high impedance mode. By presenting the output of the modulator 204 as a high impedance state when not in use, the output stages of the multiple PIUs do not load each other.

If the computer system 100 and the user are both transmitting audio signals simultaneously, the baseband audio signals from the computer system 100 and the baseband audio signals from the telephone 104 are both present at line 200C. The hybrid 208 connected to the modulator 204 and the demodulator 206 serves to subtract the baseband audio signals from the computer system 100 from the signal on line 200C before presenting the baseband signal to the modulator 204. As a result, the signal from the modulator 204 is close to a pure representation of what the user is speaking, with very little background noise from what the computer system 100 is transmitting. This allows the computer system 100 to recognize voice commands when they are given simultaneously with the audio signals coming from the computer system 100. The accuracy of the filtering process depends on how well the telephone impedance is characterized and known.

A loop simulator 210 (connected between the switch 216 and the +12V voltage signal) provides power to the telephone 104 and allows it to operate when the telephone 104 is isolated from the telephone line 130 (mode 2). The series hook detector 212 (connected between the telephone 104 and the line 200B) detects when the telephone 104 is off-hook and asserts the signal DISABLE2_ low for powering up the modulator 204 if the off-hook condition is detected. The PIU RF carrier from the PIU alerts the CIU 102 to signal the computer system 100 that voice commands may be issued soon.

A PIU carrier detector 220 is connected between lines 200A and 200B for detecting if a PIU carrier from another PIU is being transmitted. If so, the PIU carrier detector 220 asserts a signal PIUDET high. To ensure that the PIU carrier detector 220 does not assert the signal PIUDET in response to the PIU carrier signal from the modulator 204, the signal DISABLE_ is routed into the PIU carrier detector 220. If the signal DISABLE_ is high, indicating that the series hook detector 212 has not detected the telephone 104 off-hook, then the possible assertion of the signal PIUDET is enabled. The signal PIUDET is provided to the input of a busy tone generator 222 connected between lines 200C and 200B. The busy tone generator 222 is enabled when the signal PIUDET is asserted high. Thus, if another PIU is transmitting a PIU carrier, and a user picks up telephone 104, the user will hear a busy tone.

The signal PIUDET is also provided to the series hook detector 212 to disable assertion of the signal DISABLE_.

Thus if one PIU is transmitting a PIU carrier, another PIU is disabled from transmitting its PIU carrier to avoid contention. The series hook detector 212 also includes a timer that is enabled by the signal PIUDET and the telephone 104 being in the off-hook condition. Thus, if another PIU is transmitting a PIU carrier, and if the user picks up the telephone 104, the timer in the series hook detector 212 begins counting. After a predetermined period of time (for example, 5 seconds), the timer in the series hook detector 212 asserts a signal TIMEOUT to the logic and relay drive 202. In response, the logic and relay drive 202 forces the relay switch 216 to position 1 to place it into mode 1 operation, regardless of the state of the signal RELAY_ DRIVE_. In this manner, if a user of a PIU-connected telephone wants to access an outside line, but another PIU-connected telephone is communicating with the computer system 100, the outside line connection can be forced by taking the PIU-connected telephone off-hook and waiting the predetermined period of time. Effectively, the communication software detects this as if a non-PIU telephone has picked up, and responds by cutting off the CIU carrier.

COMPUTER SYSTEM

Figure 7:
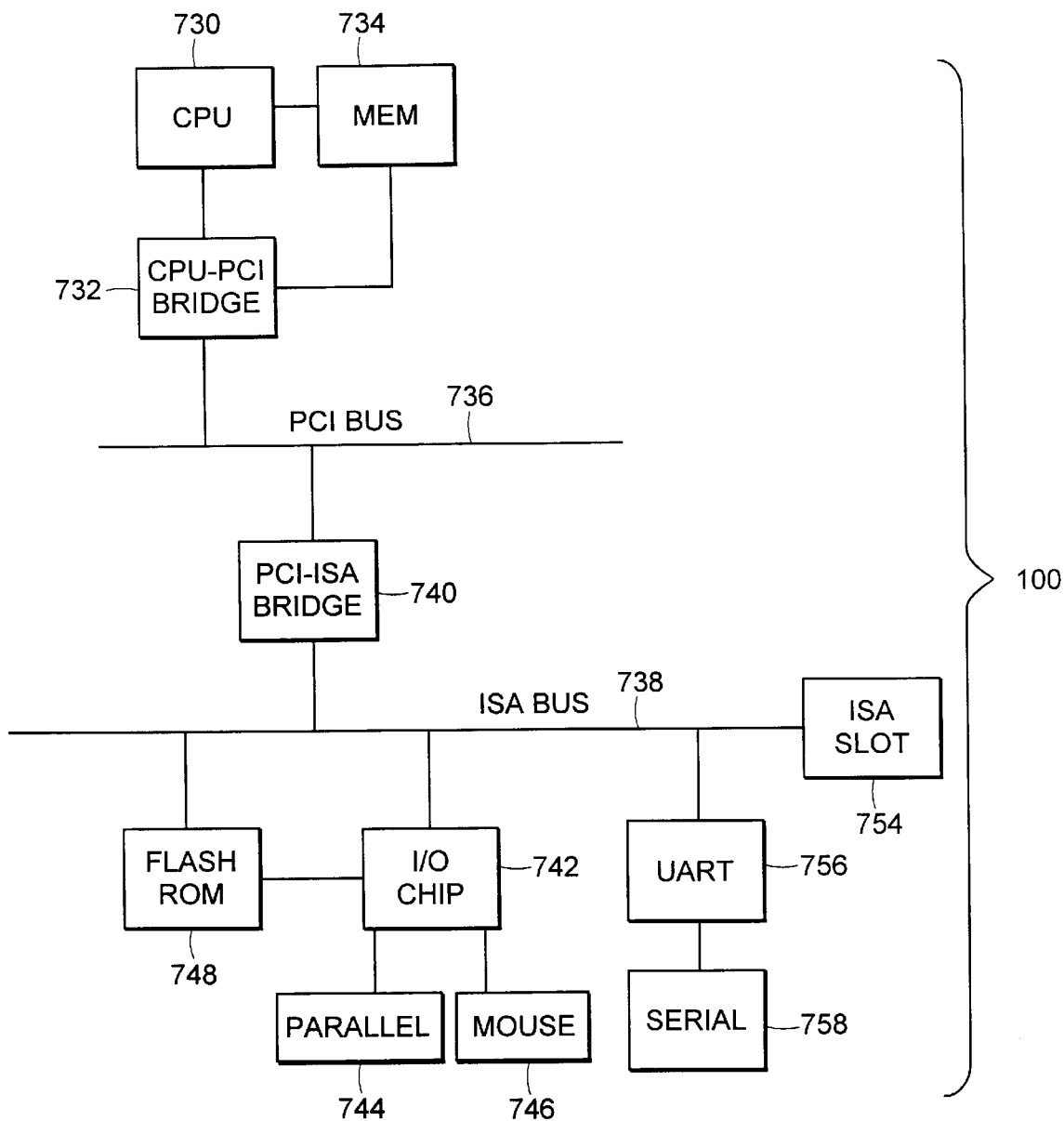
FIG. 7 is a block diagram of the computer system of FIG. 1.

As noted above, the CIU 102 includes an interface to the serial port of the computer system 100. Referring to FIG. 7, the computer system 100 includes a central processing unit (CPU) 730, such as the Pentium Pro from Intel Corporation. The CPU 730 communicates with a Peripheral Component Interface (PCI) bus 736 through a CPU-PCI bridge 732. The CPU 730 is connected to main memory 734 controlled by the CPU-PCI bridge 732. Communications between the PCI bus 736 and an Industry Standard Architecture (ISA) bus 738 is achieved through a PCI-ISA bridge 740. Peripheral components are connected to the ISA bus 738. An I/O chip 742 is connected to a parallel port connector 744 (for example, for connection to a keyboard) and a mouse connector 746. The I/O chip 742 is also connected to a flash read-only-memory (flash ROM) 748, which stores the system BIOS of the computer system 100.

Figure 6:
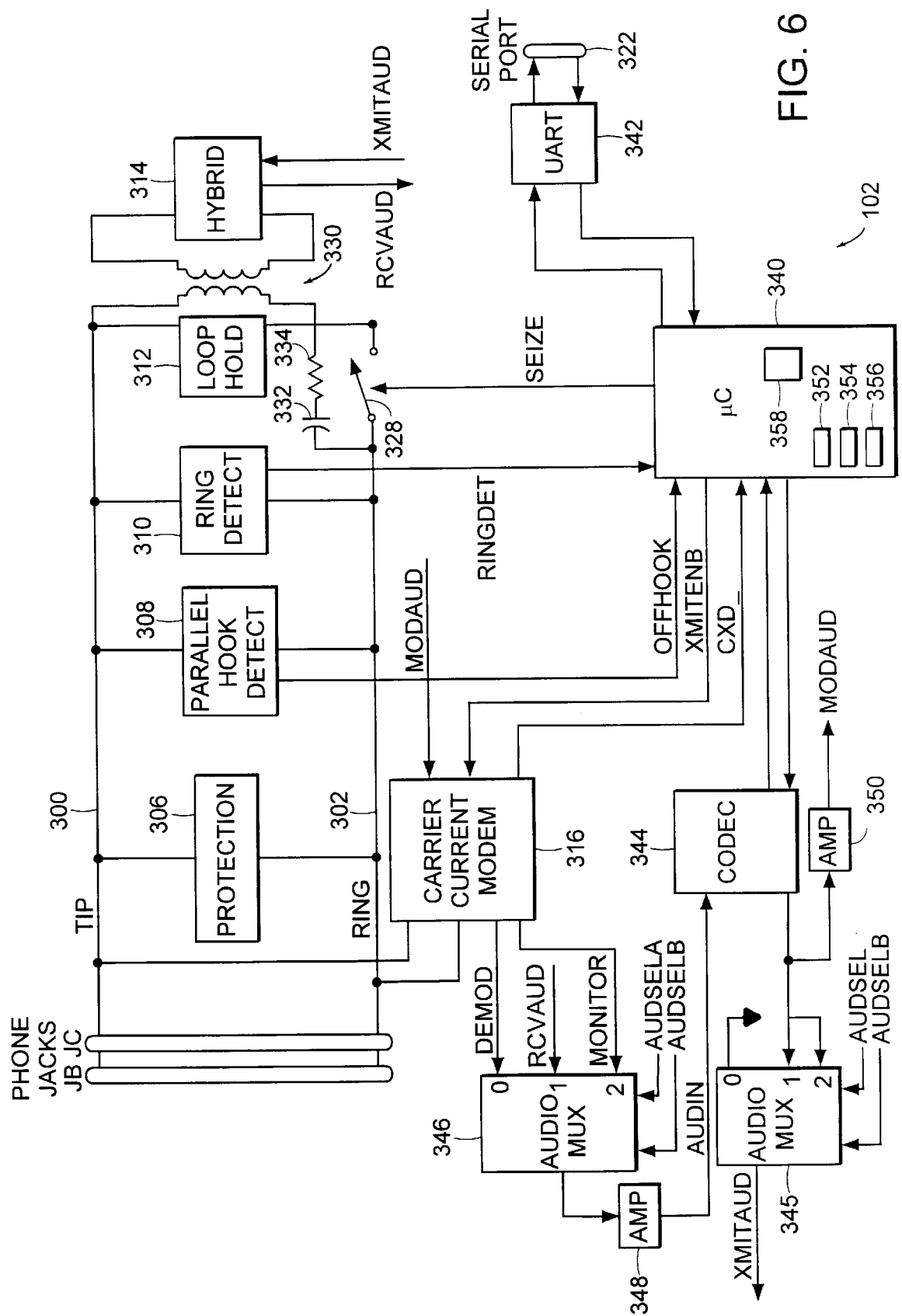
FIG. 6 is a block diagram of a computer interface unit connected to the computer system of FIG. 1.

The ISA bus 738 includes an ISA slot 754 for connection to an ISA device, such as an ISA implementation of the CIU board 102. A UART device 756 is connected between the ISA bus 738 and a serial port 758 for connection to a serial device, such as the serial-port implementation of the CIU board 102 (FIG. 6). The UART 756 translates the serial bus communication from the serial port 758 into ISA bus format, and vice versa.

COMPUTER INTERFACE UNIT

Referring to FIG. 6, the CIU 102 includes two phone jacks JB and JC in parallel for connection to the wall jack 122. The phone jacks JB and JC connect to a TIP line 300 and a RING line 302. The following components are connected between the TIP and RING lines: a protection circuit 306, a parallel hook detector 308, a ring detector 310, and a carrier current modem 316. The protection circuit 306 protects the CIU 102 from excessive voltages or currents on the TIP and RING lines and filters out high frequency noise. The parallel hook detector 308 detects if any telephone connected to line 130 has been taken off-hook. This includes any non-PIU telephone on the line 130 as well as any PIU-connected telephone which is connected to the line 130 by its associated PIU. When the differential voltage between the TIP line and the RING line is less than 24 volts for a period of several hundred milliseconds (to avoid false triggering by ringing signals and transients), the parallel hook detector 308 drives a signal OFFHOOK high.

The protection circuitry 306, a loop hold circuit 312, a telephone interface transformer 330, a relay contact 328, and a hybrid 314 provide an FCC Part 68-compliant baseband voice interface between the telephone line 130 and the CIU 102. The relay contact 328, controllable by a SEIZE signal from a microcontroller 340, connects the RING line to the loop hold circuit 312. Assertion of the signal SEIZE causes the relay contact 328 to be closed. When the relay contact 328 is closed, the loop hold circuit 312, which includes a relay, seizes the telephone network line 130 by sinking current to the line 130. As a result, the phone company 134 detects that the line 130 has been seized.

The hybrid circuit 314 separates and combines audio paths RCVAUD and XMITAUD. When the relay contact 328 is closed (that is, the CIU 102 has seized the line), the baseband audio signal on the TIP and RING lines is received by the telephone interface transformer 330 and forwarded to the hybrid 314. The signal XMITAUD is the baseband audio signal from the computer system 100, which is driven by a CODEC 344 and transmitted through an audio multiplexor 345. The hybrid 314 combines the transmitted baseband audio signal XMITAUD with the received baseband audio signal, then subtracts the transmitted audio signal XMITAUD from the combined audio signal to generate the signal RCVAUD which includes mostly the received audio signal. This combination and subtraction reduces sidetone, and is necessary for accurate speech recognition by the speech recognizer associated with the communication software.

The microcontroller includes a status register 352, a Homewires ring counter 354, and a failsafe ring counter 356. The ring detector 310 asserts a signal RINGDET when an incoming ring signal is present on the telephone line 130. The ring counters 354 and 356 decrement from initial values on the rising edge of the RINGDET signal, with the ringing counters 354 and 356 timing out when they count down to zero. The signal RINGDET follows the "envelope" of the ringing pattern, going high when a ring is received and low in between.

The Homewires ring counter 354 monitors the number of rings before the communication software answers an incoming POTS call. The failsafe ring counter 356 determines the number of rings before the microcontroller 340 disables the transmit enable signal XMITENB to shut off the CIU RF carrier, thereby disabling the PIUs and allowing a user to answer the incoming POTS call. The failsafe ring counter 356 ensures that if the communication software becomes inactive for any reason (for example, software hang condition), the PIU-connected telephones will be switched to POTS mode. The Homewires ring counter 354 powers up with the default value of 7.

The microcontroller 340 communicates with the computer system 100 through an integrated UART 342 and a serial port 322. The UART provides full-duplex, serial, asynchronous communications with the computer system 100 at 115.2 kb/s. The microcontroller 340 packetizes digitized audio data into frames for transmission to the computer system 100. In response to a computer query, the microcontroller 340 also packetizes status information for transmission to the computer. Packets received from the computer system 100 are parsed into data and control bytes by the microcontroller 340, with data bytes forwarded to the CODEC 344 and control bytes responded by CIU firmware running on the microcontroller 340. The firmware is stored in the internal read-only memory (ROM) of the microcontroller 340.

In a preferred embodiment, packets from the computer are either data packets or command packets. All packets from the UART 342 to the microcontroller 340 are presumed by the microcontroller 340 to be data packets unless the first byte of the packet contains a predetermined reserved value (for example, hexadecimal value FF). Data packets are forwarded by the microcontroller 340 to the digital data input of the CODEC 344. Thus, if the microcontroller 340 detects a first byte value of FF, the packet information is not passed to the CODEC; instead, the CIU firmware running on the microcontroller 340 executes the command specified by the command packet. The command packet is loaded into a command queue 358 in the microcontroller 340, which is retrieved by the CIU firmware for execution.

If the transmitted information includes audio data only, then any "FF" data in the stream is replaced by the communication software with "7F" to avoid mis-identification of a control packet.

If the UART 342 loses synchronization with the computer system 100 for any reason when it receives a stream of serial data from the computer system 100, it maintains the output bytes to the microcontroller 340 to the value FF until the UART 342 is able to re-synchronize. The stream of information following the last FF byte will then be the command information from the computer system 100.

Commands that are issued by the communication software running on the computer system 100 include the following: PC_GetStatus (to retrieve the value of the status register 352); PC_SeizeLine (to cause the microcontroller 340 to assert the signal SEIZE); PC_UnseizeLine (to deassert the signal SEIZE); PC_SetRingRollover (to change the initial value of the Homewires ring counter 354); PC_GoIdle (to cause the CIU to go to an idle state); PC_GoInactive (to cause the CIU to go to an inactive state); PC_HWCallAck (to acknowledge that the communication software has answered the Homewires call); PC_DropCIUCarrier (to stop transmission of the CIU carrier); PC_SetMonitorMode(on) (to inform the CIU 102 that the communication software has started to monitor the line); PC_SetMonitorMode(off) (to inform the CIU 102 that the communication software has stopped monitoring the line); PC_ClearRingTrigger (to re-initialize the fail-safe ring counter 356); and commands to set the time-out parameters of the CIU firmware.

The last byte of the command packet is a cyclic redundancy check (CRC) byte, which is checked by the microcontroller 340 to determine if the received command packet contains valid information. If the command packet is valid, the microcontroller 340 responds by transmitting status information (including the contents of the register 352) back to the computer system 100 to let the communication software know that the command packet has been received successfully. However, if the microcontroller 340 determines that the command packet information is invalid (for example, due to erroneous bits caused by noise during transmission), the microcontroller 340 does not respond. Each command packet includes a sequence number (0 or 1). After a time-out period, if no acknowledgement has been received, the communication software re-sends the command packet with the same sequence number. If the resent command packet information is valid, the microcontroller 340 responds by sending the status information.

The computer system 100 may also have mistakenly assumed that the microcontroller 340 did not receive the original packet successfully if the status information sent back somehow became corrupted. Accordingly, if the microcontroller 340 sees a command packet with the same sequence number, it will not execute the command again but will retransmit the status information back to the computer system 100.

The CIU firmware will alert the computer system 100 about certain events, which include ring detect (RINGDET active), off-hook event detected (OFFHOOK active), and flash-hook event detected (OFFHOOK pulsed low for less than one second). The CIU firmware will periodically (for example, at 100 ms intervals) send an alert message—CIU_AlertInfo( )—to the computer system 100 until the communication software responds by sending a ReadStatusRegister command to the microcontroller 340.

The microcontroller 340 provides all necessary master, frame and bit clocks to the CODEC 344. The CODEC master clock is derived from the microcontroller 340, allowing synchronous generation of CODEC frame and bit clocks from the microcontroller port pin signals.

The microcontroller 340 includes a caller ID buffer to store any incoming caller ID information. This caller ID information can be presented to the communication software along with an incoming POTS call to notify the user who the caller is.

The CIU firmware includes a flash-hook detector, which monitors the state of the signal OFFHOOK for a flash-hook event. When the signal OFFHOOK is asserted, it indicates a telephone is trying to seize the line 130. A user hitting the flash hook button at the telephone causes the signal OFFHOOK to be pulsed low. To avoid detecting a call-waiting signal as a flash-hook event while a user is on the phone with an external caller, the CIU firmware includes a timer which times out after a predetermined period of time, for example, five seconds. Before time-out, the CIU firmware will detect a flash-hook event. After time-out, however, the CIU firmware ignores any flash-hook event.

The microcontroller 340 also includes 32-byte transmit and receive buffers to synchronize transfer of information between the UART 342 and the CODEC 344. The CODEC provides analog-to-digital (A/D) and digital-to-analog (D/A) conversion of audio signals to and from the computer system 100. The CODEC 344 is an 8-bit, 8-kHz, telephony CODEC. Digital speech data originating at the computer system 100 is passed to the microcontroller 340, then to the CODEC 344 for D/A conversion and smoothing. The CODEC 344 then transmits the output signal as XMITAUD through the 1 and 2 inputs of the audio multiplexor 345. The 0 input of the audio multiplexor 345 is tied low, and its select inputs are connected to signals AUDSELA and AUDSELB. The states of the signals AUDSELA and AUDSELB are controlled by the CIU firmware, with the signal XMITAUD (discussed below) being transmitted only when a Homewires call is not in progress (that is, when AUDSELA, AUDSELB have binary values 01 and 10).

The output signal from the CODEC 344 is also provided to the input of an amplifier 350, which generates a signal MODAUD provided to the carrier current modem 316 to frequency modulate the CIU RF carrier onto the telephone line 130.

Incoming speech from an audio multiplexor 346 is provided to an amplifier 348, which then provides the incoming data to the analog data input of the CODEC 344. The CODEC 344 bandlimits (for example, 200 to 3400 Hz) and digitizes the incoming speech data, then passes it to the microcontroller 340 to output to the computer system 100. The audio multiplexor 346 selects one of three audio sources, based on the state of the signals AUDSELA and AUDSELB, for digitization by the CODEC 344: a demodulated PIU RF signal DEMOD from the carrier current modem 316; POTS voice data RCVAUD from the hybrid 314; and a MONITOR signal from the carrier current modem 316 which monitors voice data on the telephone line 130 without having to seize the line 130.

The microcontroller 340 monitors the state of the following signals: the carrier detect signal CXD_ from the carrier current modem 316; the OFFHOOK signal from the parallel hook detector 308; and the ring detect signal RINGDET from the ring detector 310. The microcontroller 340 generates the following signals: a signal XMITENB to the carrier current modem 316 to enable the CIU RF carrier onto the telephone line 130; and the signal SEIZE to seize the line 130.

Figure 8:
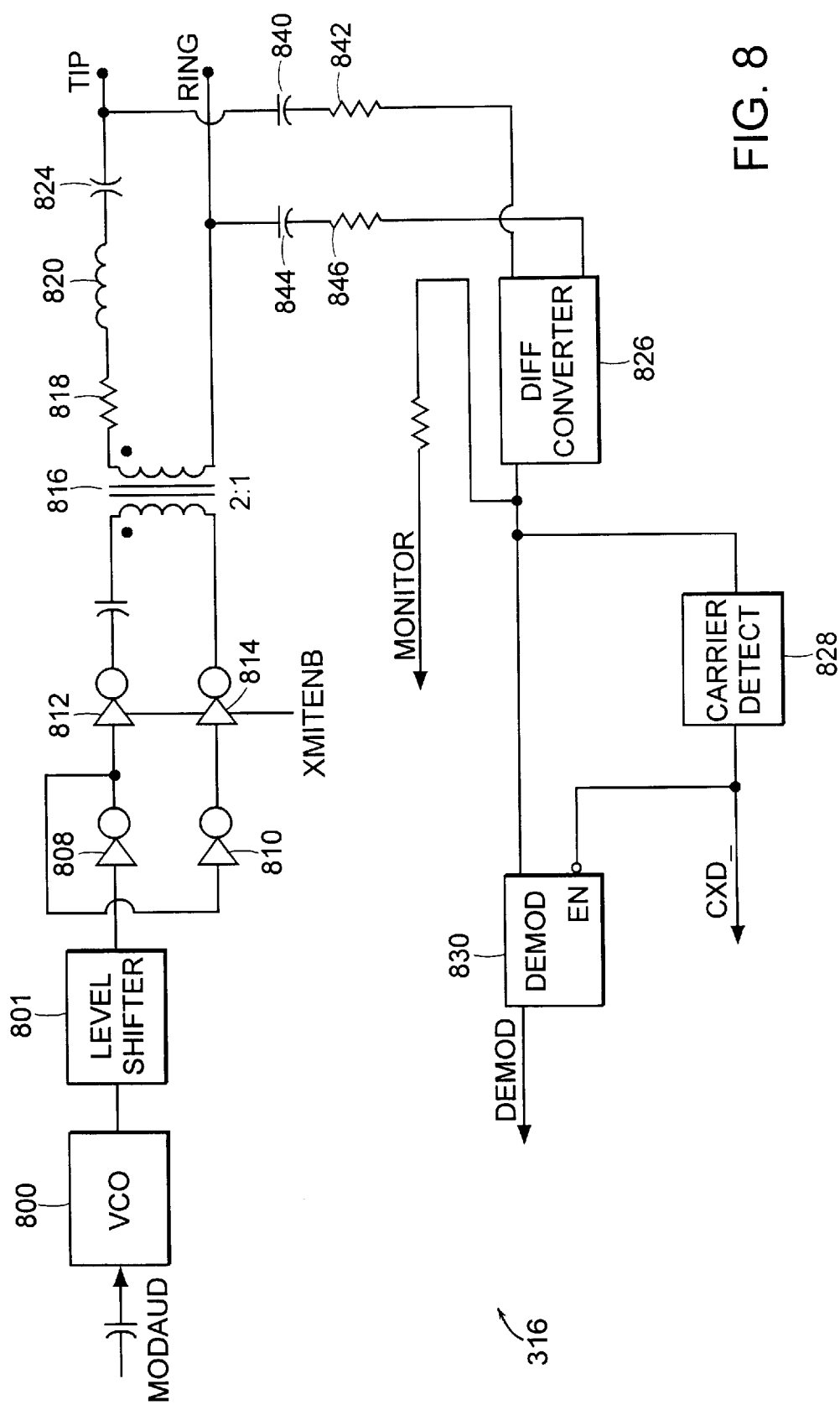
FIG. 8 is a schematic diagram of a carrier current modem in the computer interface unit of FIG. 6.

The carrier current modem 316 modulates and demodulates audio signals and controls bi-directional communication between the computer system 100 and the PIU-connected telephones. Referring to FIG. 8, on the output side, the carrier current modem 316 includes a voltage-controlled oscillator (VCO) 800, which is frequency modulated by a signal MODAUD (the baseband analog signal from the computer system 100 through the CODEC 344). The VCO 800 generates a square wave at its output. The center of frequency of the VCO 800 is preferably 310 kHz. The output of the VCO 800 is provided to a level shifter 801 for level shifting the square wave. The output of the level shifter 801 is applied to the input of a CMOS inverting driver 808, whose output is connected to the input of an inverting driver 812 and an inverting driver 810. The output of the driver 810 is connected to the input of an inverting driver 814. The drivers 812 and 814 are enabled when the signal XMITENB is asserted by the microcontroller 340. When enabled, the drivers 812 and 814 drive a transformer 816 in an AC-coupled full-bridge configuration.

On the other side of the transformer 816, a tank circuit including a capacitor 824, an inductor 820, and a resister 818, matches the transformer 816 to the TIP and RING lines and filters the square wave from the drivers 812 and 814 into a narrow-band sine wave signal, which is transmitted as the CIU RF carrier over the telephone line 130.

On the receiving direction, the incoming signal on the TIP and RING lines is AC-coupled to a differential-to-single-ended converter 826. The output of the differential converter 826 is a ground-referenced copy of the signal (either a baseband audio signal from an external telephone or an RF carrier signal from a PIU) on the TIP and RING lines. When a received PIU RF carrier (for example, in the 485 kHz range) is present, the signal passes through a band-pass filter in the differential converter 826 to the demodulator 830, which includes a phase-locked loop (PLL) with its own center-frequency oscillator. If its enable input is active, the demodulator 830 produces the output voltage signal DEMOD proportional to the input carrier's deviation from the center frequency.

The output of the differential converter 826 is also connected to the input of a PIU RF carrier detector 828. When a PIU RF carrier is present, the carrier detector 828 drives the signal CXD_ low, which is connected to the enable input of the demodulator 830. The signal CXD_ low notifies the microcontroller 340 that a PIU-connected telephone has been taken off-hook and a PIU RF carrier has been detected. If a received carrier is not in the range of frequency of the PIU carrier (for example, 485-kHz range), the signal CXD_ is deasserted high and the demodulator 830 is turned off ("squelched" or "muted") to prevent distracting audio noise.

A line MONITOR signal, which is provided to the audio multiplexor 346, allows the CIU 102 to monitor baseband voice data on the telephone line 130 without the CIU 102 having to go off-hook. This allows the CIU 102 to monitor POTS calls for instructions to go off-hook and participate in the POTS call as described below.

Referring again to FIG. 6, the signals CXD__, OFFHOOK, RINGDET, SEIZE, XMITENB, and the current state CIUSTATE[1:0] of the PCIU firmware are stored in the status register 352 of the microcontroller 340. When the communication software issues the command PC__GetRingRollover to the microcontroller 340, the count of the Homewires ring counter 354 is retrieved. If the command PC__GetStatus is issued, the contents of the status register 352 are sent back to the computer system 100 in the form of a CIU__Status packet.

The microcontroller 340 also clears the signal XMITENB when a telephone is taken off-hook. The reason for this direct hardware clearing is to ensure that the CIU RF carrier is not placed on the telephone network line 130 during normal telephone operation which then avoids violating FCC requirements.

The microcontroller 340 asserts the SEIZE signal, closing switch 328, to cause the CIU 102 to seize the telephone network line 130, which will result in a local off-hook detect and which will also clear the XMITENB bit.

Thus, the communication protocol between the PIUs and the CIU 102 in the telephone system of FIG. 1 includes the following information: off-hook/on-hook indication (line bias voltage); ring detect indication (ringing signal on the telephone line 130); PIU carrier present indication; and CIU carrier present indication. A line bias voltage less than about 24 volts for a predetermined period (for example, several hundred milliseconds) indicates that a telephone on the line 130 is off-hook. Otherwise, if the line bias voltage does not satisfy this condition, then all the telephones are on-hook in the telephone network.

The ring detect indication is true if the telephone line 130 has an oscillating voltage having a frequency within the range from about 15 to 68 Hz and an amplitude above about 50 volts. The CIU carrier is present if an RF carrier signal is present which is centered at a first frequency (for example, 310 kHz) and has an amplitude greater than about 4 volts. The PIU carrier present indication is true if an RF carrier signal is present which is centered at a second frequency (for example, 485 kHz) and has an amplitude greater than about 4 volts. The channel for both the PIU and CIU carrier signals is about 20 Hz, although a different channel width can be used.

COMPUTER INTERFACE UNIT FIRMWARE

Figure 9A:
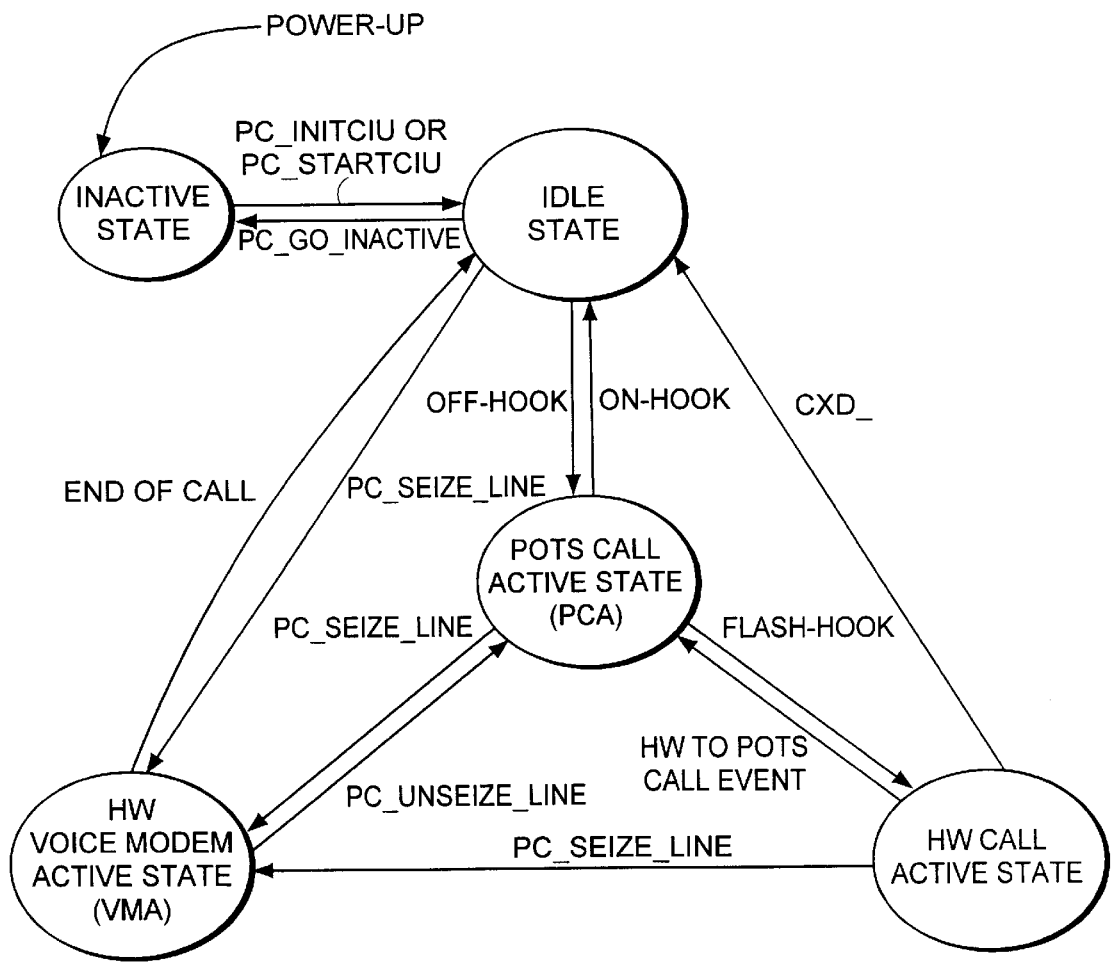
FIGS. 9A, 9B and 9C are state diagrams of firmware running on the computer interface unit of FIG. 6.
Figure 9B:
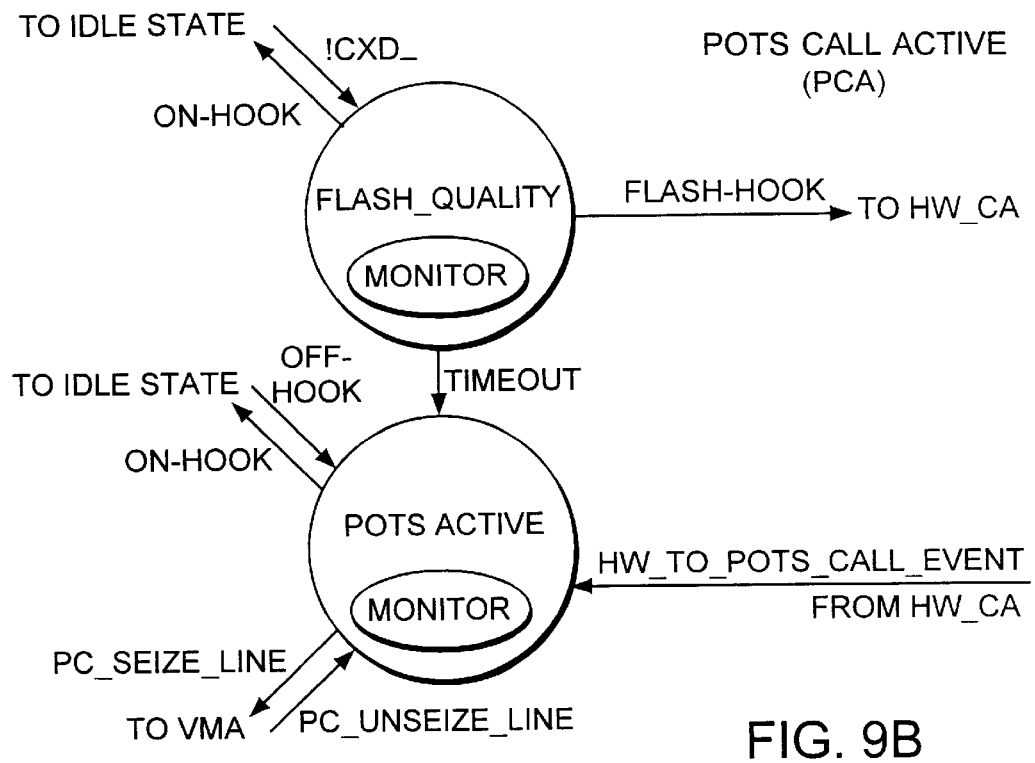
Figure 9C:
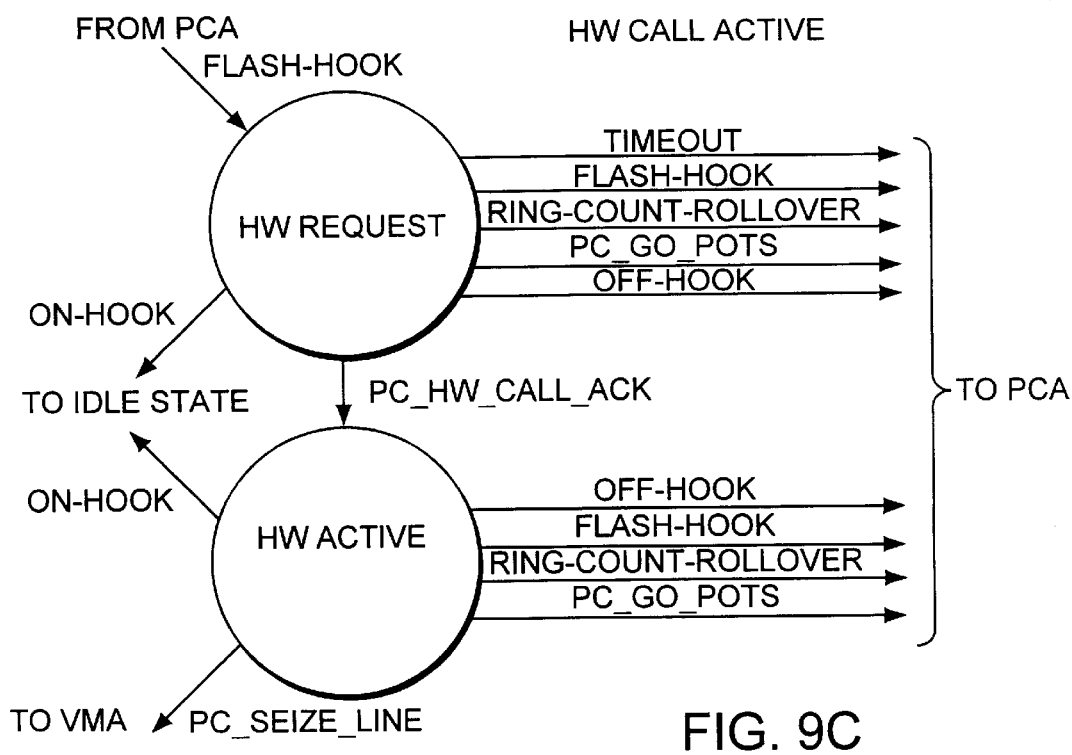

Referring to FIGS. 9A–9C, a state diagram shows the function of the CIU firmware running on the microcontroller 340. The behavioral modes of the CIU 102 correspond to the operational modes of the communication software running in the computer system 100. The CIU firmware powers up in an Inactive state in which the telephone system behaves as a POTS system. The CIU firmware has 4 active states: Idle, HWCallActive, HWVoiceModemActive, PotsCallActive. The PotsCallActive state includes two sub-states: PotsActive and FlashQualify. The HWCallActive state also has two sub-states: HWRequest and HWActive.

The CIU firmware remains in the Inactive state while the communication software in the computer system 100 remains inactive. In the Inactive state, the signal XMITENB is asserted by the microcontroller 340 to the carrier current modem 316, which places the 310-kHz RF carrier on the telephone line 130 for the purpose of charging the PIUs.

When the communication software is powered on, it issues a PC__InitCIU command to the microcontroller 340 through the serial port 322 to establish a communication link with the CIU 102. This causes the CIU firmware to transition to the Idle state, in which the CIU firmware waits for one of several events to occur. The communication software can also transmit a PC__StartCIU command to establish the communication link. In the Idle state, the signal XMITENB is maintained high to enable the CIU carrier. When the communication software in the computer system shuts down, a command PC__GoInactive is transmitted, causing the CIU firmware to transition back to the Inactive state.

In the Idle state, if a non-PIU telephone is taken off-hook (the signal OFFHOOK is asserted but the signal CXD__ is not), the CIU firmware transitions to the PotsActive sub-state of the PotsCallActive state. The signal XMITENB is shut off.

If a PIU-connected telephone is taken off hook, the signal CXD__ is asserted by the carrier current modem 316. The CIU firmware responds by deasserting the signal XMITENB to switch the PIUs to mode 1 (pass-through state) and transitioning to the FlashQualify sub-state, in which the firmware waits a predetermined period of time (for example, 5 seconds) for a flash-hook event to be received. If no flash-hook event is received before time-out, the firmware transitions to the PotsActive sub-state. Typically, the user will issue a flash-hook within a short time of picking up the PIU-connected telephone. If not, the time-out period ensures that call-waiting during a POTS call does not falsely trigger the firmware to enter into Homewires call mode.

In the FlashQualify sub-state, if a flash-hook event is detected (the signal OFFHOOK is pulsed low for less than one second), the CIU firmware transitions to the HWRequest sub-state of the HWCallActive state. The communication software detects the flash-hook condition and responds accordingly. If the communication software responds within a time-out period (for example, 10 seconds) with an PC__HWCallAck command, the CIU firmware transitions from the HWRequest sub-state to the HWActive sub-state, in which the microcontroller 340 maintains the signal XMITENB asserted to cause the CIU RF carrier to switch the PIU to mode 2. However, if the 10-second time-out occurs, the CIU firmware transitions to the PotsActive sub-state, causing the microcontroller 340 to maintain the signal XMITENB negated.

In the PotsCallActive state, the signals AUDSELA and AUDSELB are driven to a state to select the signal MONITOR at the audio multiplexor 346. This allows the computer system 100 to listen in on the POTS call. The computer system 100 can then be instructed to seize the telephone line 100 and provide services to the local or remote call participants.

From the HWRequest sub-state, the CIU firmware can also transition back to the PotsActive sub-state if any one of the following occurs: the user has issued another flash-hook; the failsafe ring counter 356 in the microcontroller 340 expires after the predefined number of incoming rings; the command PC__GoPots is received from the communication software (for example, in response to a user command to seize the line); or if the signal OFFHOOK is true (that is, either a non-PIU telephone is taken off-hook or another PIU-connected has been taken off-hook and the 5-second timer in the PIU expired).

In the HWActive sub-state, the signals AUDSELA and AUDSELB are both set low to select the demodulated signal DEMOD at the audio multiplexor 346. In addition, the signal XMITENB is maintained asserted to perform a full-duplex voice communication between the computer system 100 and the PIU-connected telephone via the CODEC 344 and the carrier current modem 316. If a non-PIU telephone is lifted or a PIU-connected telephone is lifted and five seconds have elapsed (OFFHOOK asserted high), the CIU firmware transitions to the PotsActive sub-state, causing the CIU carrier to be disabled to revert the telephone system back to POTS behavior.

In the HWActive state, if the user decides to issue a command to place an outside call or to answer an incoming call, the communication software responds by issuing a PC_GoPots command, which causes the CIU firmware to transition from the HWActive sub-state to the PotsActive sub-state.

When an incoming ring is received while the CIU firmware is in the HWActive sub-state, the communication software can notify the user who the calling party is based on the caller ID information. If the user and communication software do nothing (for example, software hangs) and the failsafe ring counter 356 expires, the firmware also transitions back to the PotsActive sub-state, where the signal XMITENB is disabled to allow the user to answer the call from a PIU-connected telephone.

If the communication software is instructed to connect the incoming POTS call, it issues the command PC_SeizeLine, which causes the CIU firmware to transition from the HWActive sub-state to the HWVoiceModemActive state. In this state, the microcontroller 340 asserts the signal SEIZE to seize the telephone line 130 to create a baseband link from the CODEC 344 to the telephone line 130. This allows an outside caller to talk with the voice mail in the computer system 100 as well as to allow the computer system 100 to dial an out-going number by sending a DTMF tone data through the CODEC 344 to the telephone line 130. After the communication software has completed the POTS call, it issues the PC_UnseizeLine command, which causes the CIU firmware to transition from the HWVoiceModemActive state to the PotsActive sub-state. From the PotsActive sub-state, if the user hits flash-hook again within the five-second time-out window, the CIU firmware transitions back to the HWActive sub-state to continue the Homewires call.

From the HWCallActive state, the CIU firmware transitions back to the Idle state if the signal CXD_ is deasserted to indicate the user has hung up. In the HWCallActive state, the PIUs handle the situation in which another PIU-connected telephone is picked up while a Homewires call is active. The second user initially obtains a busy tone from the picked-up PIU (FIG. 5). After the time-out period (for example, 5 seconds), the second PIU goes off-hook (as described with respect to FIG. 5), which causes the CIU 102 to detect assertion of the OFFHOOK signal. The CIU firmware then cuts off the CIU carrier to place the original telephone back on-hook, and the CIU firmware transitions back to the Idle state.

In addition, in the PotsCallActive state, the CIU firmware monitors the state of the signal OFFHOOK to determine when all the telephones have gone on-hook and the POTS call has ended. If so, the CIU firmware returns to the IDLE state.

In the Idle state, the microcontroller 340 reports incoming rings to the computer system 100. If the Homewires ring counter 354 expires, the communication software may command the CIU 102 to seize the line 130 with the PC_SeizeLine command, thus allowing the computer system 100 to provide voice mail and other services to the caller. If this happens, the CIU firmware transitions to the HWVoiceModemActive state, in which all voice data from the remote caller are transmitted by the CODEC 344 through the microcontroller 340 to the computer system 100. In the HWVoiceModemActive state, the signals AUDSELA and AUDSELB are set high and low, respectively, to select the received baseband signal RCVAUD at the audio multiplexor 346. Once the remote telephone call has ended (for example, the firmware detects a dial tone), the microcontroller 340 sets a dial-tone detect flag and the CIU firmware returns to the Idle state.

In the Idle state, if the communication software does not respond to an incoming call, then only the ringing status is passed to the communication software. Nothing happens until the failsafe ring counter 356 expires, as described above, or a user picks up a telephone, which causes the CIU firmware to transition to the PotsCallActive state.

COMMUNICATION SOFTWARE

Figure 10:
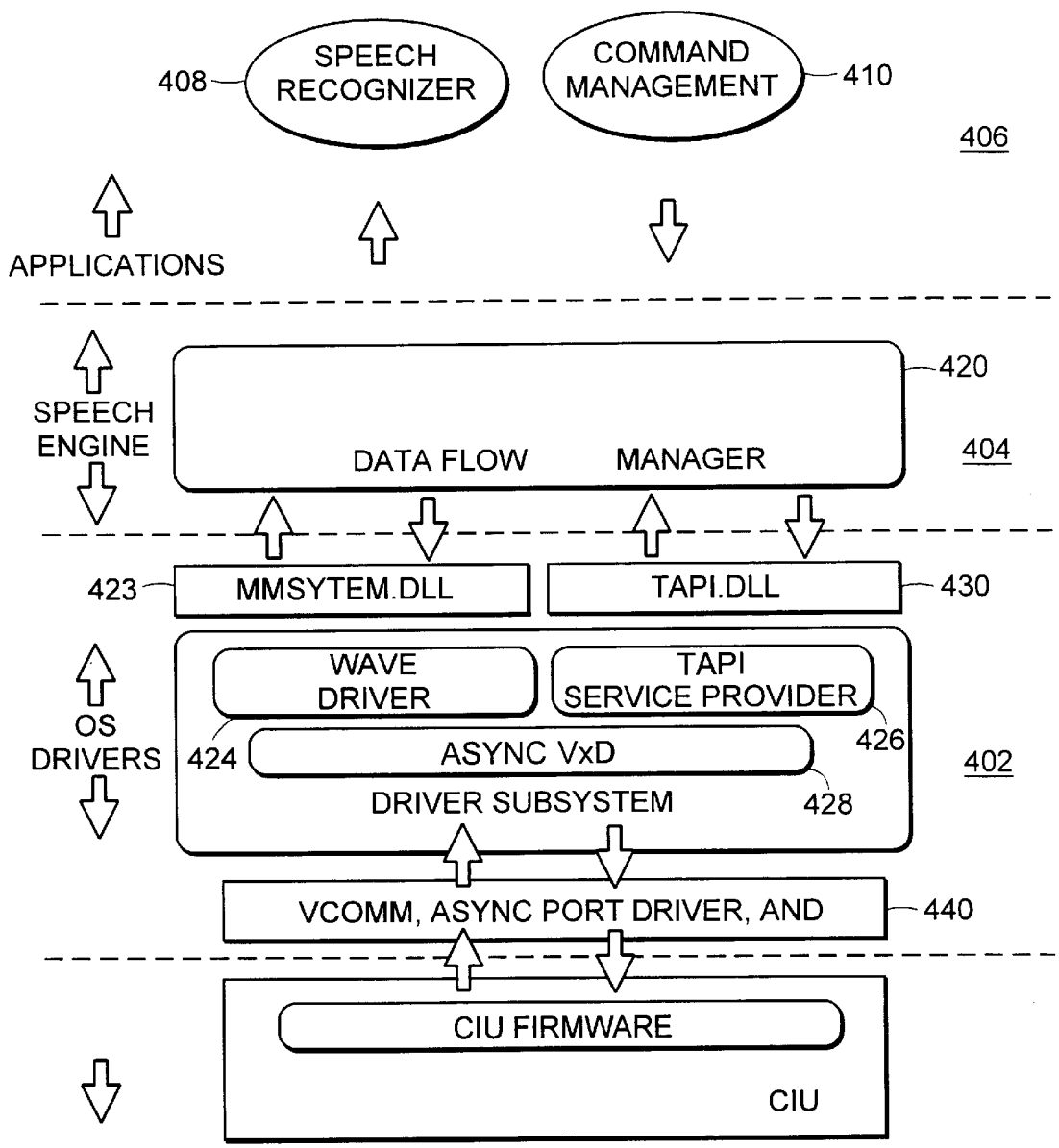
FIG. 10 is a block diagram of layers in the communication software running in the computer system of FIG. 1.

Referring to FIG. 10, the communication software in the computer system 100 can be thought of as having 3 layers or levels, which are the applications layer 406, the speech engine layer 404, and the operating system driver layer 402. A fourth layer of the communication software can be thought of as including the CIU firmware. The highest level includes the applications level 406, which includes application programs such as a speech recognizer program 408 and a command management program 410 for performing tasks in response to commands recognized by the speech recognizer program 408. Voice data received and recognized by the speech recognizer program 408 are converted into corresponding commands issued to the command management program 410.

The command management program 410 provides such functions as voice mail, voice e-mail, fax, voice dialing, and address book management. The command management program 410 includes speech control scripts for controlling the "discourse" or conversation between a user on a telephone (connected to the telephone network line 130 or remotely connected to the external phone line 128). The scripts are started by one of two types of events: an incoming phone call or an event generated by an application running on the computer system 100. The scripts determine how the computer system 100 interacts with the user, and what applications/activities are to take place in the computer system 100 in response to user commands.

The speech recognizer 408 and command management program 410 communicates with the CIU firmware through a data flow manager 420, the operating system driver layer 402, a serial port device driver VCOMM 440, and the serial port 758.

A third layer in the communication software is the speech engine 404, which includes the data flow manager 420. The data flow manager 420 responds to telephony application programming interface (TAPI) events and uses the standard multimedia control interface (MCI) wave driver provided by the operating system (for example, Windows 95). Further, the data flow manager 420 notifies the OS driver layer 402 whether it is monitoring the communications line, that is, whether it is interested in receiving events from the CIU firmware.

Another layer in the communication software is the operating system drivers layer 402, which includes a set of operating system-compatible drivers (such as those supplied with the Windows 95 operating system). The drivers include a TAPI service provider (TSP) 426 for call control, a wave file driver 424 that meets the MCI standard for digitized voice control, and an async virtual device driver (VxD) 428 that accesses and controls the asynchronous port to the CIU 102.

The wave file driver 424 provides a fixed 8000 sample-per-second interface for either standard 12-bit PCM sample data or 8-bit μ-Law encoded data. The CIU 102 provides 8-bit μ-Law encoded data, which the wave driver 424 converts into PCM data for transmission to the data flow manager 420. The wave file driver 424 converts the PCM data into μ-Law encoded data for data transmitted to the CIU 102. The μ-Law-to-PCM decoding process converts an 8-bit μ-Law sample into a 12-bit or 16-bit PCM signal for use by the data flow manager 420. This conversion can be performed using table lookups. The transmitted audio data are temporarily stored in buffers, with the buffered data being transmitted sequentially to provide a continuous stream of data.

The wave file driver 424 is built according to standard multimedia system wave input (WIDM) and wave output (WODM) API interface specifications provided by Microsoft Corporation. Output data, converted in the manner described above, is passed to the device object 436 and asynch VxD 438, which then transmits the audio data stream to the CIU 102 over the serial link in the order of delivery. CIU command packets may be merged into the outgoing stream of audio data, with the command packets being recognized by the unique header "FF".

Data received by the asynch VxD 438 is presumed to be audio data unless preceeded by a predetermined value (such as "FF") to denote a control packet. The received audio data is passed by the asynch VxD 438 to the wave file driver 424 for conversion before it is supplied to the device object 436 and forwarded by an audio driver to the standard MMSYSTEM.DLL interface provided by Microsoft Corporation. The MMSYSTEM.DLL interface transmits the data to the application program layer 406.

The TAPI service provider 426 translates the control signals from the CIU 102 into behavior that mimics a standard telephone line. The TSP 426 is also capable of supporting 2 simultaneous calls (a standard plain old telephone service or POTS phone call and a Homewires call) on a single line. The TSP 426 allows asymmetric "on-hold" capability, that is, a Homewires call can be placed on hold to take a POTS call, but a POTS call cannot be placed on hold to take a Homewires call. The parallel hook detector 308 in the CIU 102 notifies the TSP 426 of an off-hook event through the CIU firmware, the serial port 758 (FIG. 7), the serial port device driver VCOMM (FIG. 10), and the async virtual device driver 428 (FIG. 10). Another feature of the TSP 426 is its ability to debounce signals passed by the async VxD 428 from the serial port 758. By using the TSP 426 to emulate some of the hardware functions, hardware complexity is reduced which results in cost savings. Alternatively, such features can be implemented in the CIU firmware.

TAPI SERVICE PROVIDER

Figure 11:
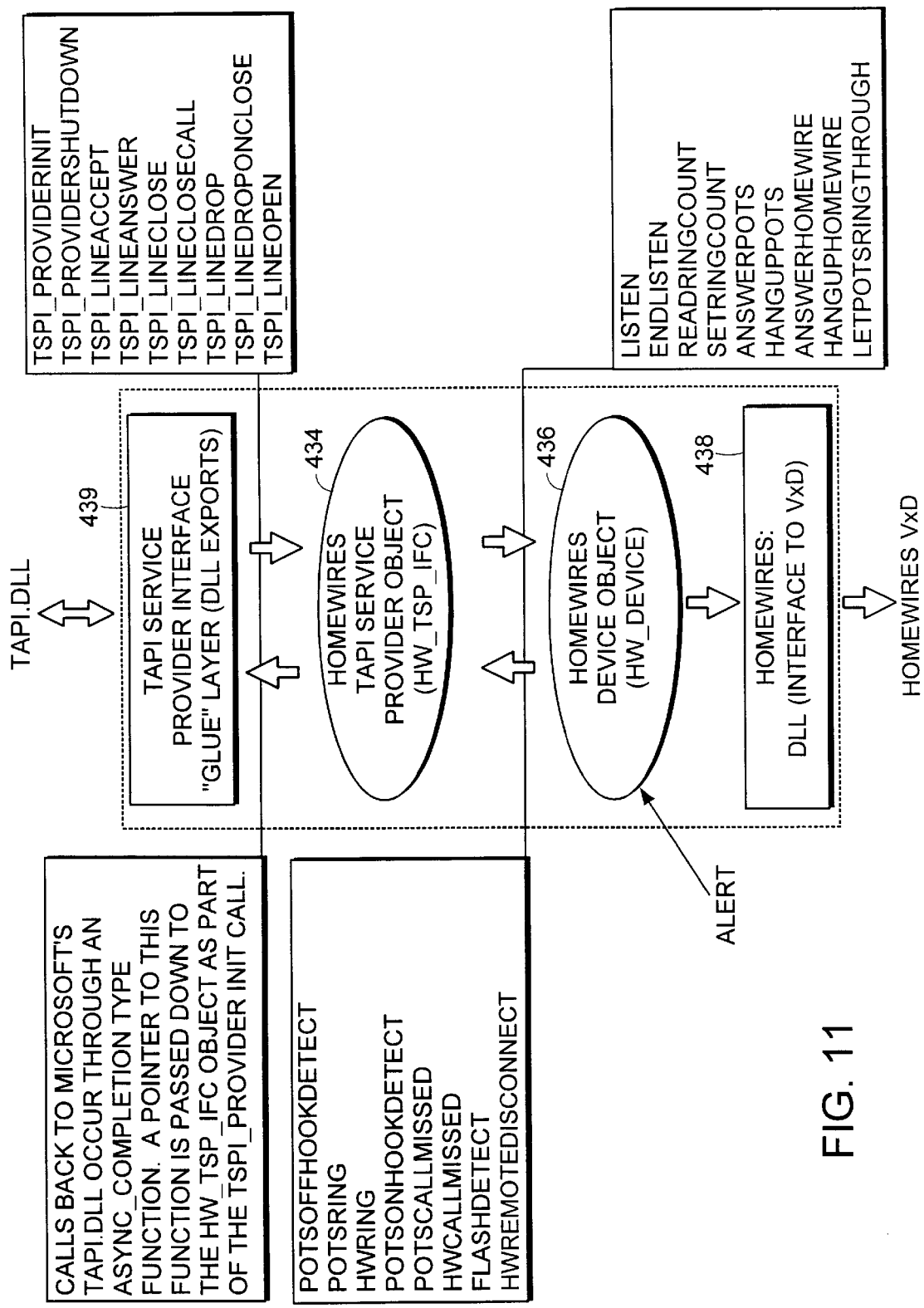
FIG. 11 is a block diagram of the layers in a Telephony Application Programming Interface (TAPI) service provider in the communication software of FIG. 10.

Referring to FIG. 11, the TSP 426 is divided into three layers: a TAPI service interface (HW_TSP_IFC) object 434, a device (HW_DEVICE) object 436, and a VxD interface DLL 438. The HW_TSP_IFC object 434 is called by a TAPI.DLL file 430 and implements TAPI calls. The TAPI.DLL file is a Windows library of functions specific to the telephony application programming interface.

The TAPI.DLL 430 receives calls from the command management program 410 (through the data flow manager 420) and parses the calls into commands issued to the TSP 426 through a TSP glue layer 439. The available commands are set forth in the Telephony Application Programming Interface Specification published by Microsoft Corporation, which is hereby incorporated by reference. A TAPI.DLL command is prefixed by "TSPI" in the ensuing description. The TSP 426 communicates with the TAPI.DLL 430 through an ASYNC_COMPLETION type function, with the pointer to the function passed down to the HW_TSP_IFC object 434 as part of a TSPI_ProviderInit call (issued when the TAPI.DLL 430 initially powers up).

The TSP 426 provides call progress monitoring and information for a POTS call through the HW_TSP_IFC object 434. This allows the computer system 100 to monitor POTS calls, even if they are made from a non-PIU telephone. The monitored voice data is received through the MONITOR line from the carrier current modem 316.

The HW_DEVICE object 436 (implemented as a C++ object) sits below the HW_TSP_IFC object 434. The HW_DEVICE object 436 translates Homewires call control signals (including POTS signals) into TAPI events for the HW_TSP_IFC object 434, and provides the interface to the async virtual device driver (VxD) 428 through the async VxD DLL 438. The events include: PotsOffHookDetect (a telephone is off-hook and conducting a POTS call); HWRing (a Homewires ring is detected); PotsRing (an incoming ring signal is detected); PotsOnHookDetect (the POTS telephone has hung up); PotsCallMissed (an incoming POTS call was detected by the CIU 102 but the outside caller hung up before the communication software could answer); HWCallMissed (a PIU carrier was detected but the PIU-connected telephone was hung up before the communication software could respond); FlashDetect (a flash-hook is detected); and HWRemoteDisconnect (a remote disconnect event has occurred).

According to another aspect of the present invention, since the events received follow signals from the CIU 102, the HW_DEVICE object 436 conditions the signals to provide more telephone-like behavior and to debounce the signals to remove noise components, such as those due to ringing and transient spikes. For example, when the HW_DEVICE object 436 sees a carrier detect, and no Homewires call is in progress, it generates a standard periodic phone ringing event HWRing to the HW_TSP_IFC 434. In addition, the signals transmitted from the CIU firmware through the async VxD 428 tend to be "bouncy" or noisy, since a hardware debouncer is not included in the CIU 102. The HW_DEVICE object 436 includes a state machine which debounces any transient spikes or ringing in an incoming signal. By implementing these features in the device driver software, that is, the HW_DEVICE object 436, rather than in hardware on the CIU 102, hardware complexity is significantly reduced. Further, reliability is improved as there are fewer hardware components which are subject to failure.

Defined under the HW_TSP_IFC object 434 are the following public methods. A method HW_NETWORK_IFC( ) constructs a new HW_TSP_IFC object 434 and initializes the object's data structures. A method ~HW_NETWORK_IFC( ) destroys the current HW_TSP_IFC object 434. If the HW_TSP_IFC object 434 is currently connected to the line when ~HW_NETWORK_IFC( ) is issued, it first notifies the HW_DEVICE object 436 to disconnect the line, and then calls the appropriate commands to shut down call-back processing from the VxD interface DLL 438.

The HW_TSP_IFC object 434 also supports line/device control public methods which are processed by the HW_DEVICE object 436. The methods include the following: Listen (start monitoring and reporting line events);

EndListen (stop monitoring and reporting line events) ; AnswerHomewire (answer Homewires call from a PIU-connected telephone); HangUpHomewire (hang up active Homewires call); AnswerPots (seizes the line to answer POTS call); HangUpPots (hang up current POTS call); SetRingCount (set the initial value of the Homewires ring counter 354 in the microcontroller 340); ReadRingCount (read the value of the Homewires ring counter 354); and LetPotsRingThrough (set the Homewires ring counter 354 to the value 1 to allow subsequent rings to come through immediately).

In more detail, the method Listen notifies the HW_DEVICE object 436 to monitor the line for status changes, which includes establishing the connection to the VxD interface DLL 438 and initializing polling of the CIU 102 by the async VxD 428. The method EndListen stops the line monitoring process. The method SetRingCount (NUMRINGS) sets the allowed number of rings to allow before the CIU 102 switches to baseband, that is, seizes the line to pick up the external call. The number can range, for example, between 0 and 7, with a setting of 0 indicating never switch to baseband except under computer control.

Another layer in the TSP 426 is the VxD interface DLL 438, which is an interface layer between the HW_DEVICE object 436 and the async VxD 428. The VxD DLL 438 provides call-back processing through which the async VxD 428 can report status changes and command completion events. The VxD DLL 438 provides a hidden window to which VxD messages are sent. The call-back procedure in the VxD DLL 438 DLL must remain resident in memory to prevent events from the async VxD 428 from trashing other system resources.

Effectively, the VxD interface DLL 438 provides a C interface to the async virtual device driver VxD 428. The TAPI.DLL file 430 creates a special 16-bit process from a program TAPI32.EXE to act as an application context in which the TSP 426 can make various Windows calls. A "single" application context (the one created by TAPIEXE.EXE) remains alive between the initialization/shutdown paired call to the TSP 426.

The VxD interface DLL 438 uses the process created by TAPIEXE.EXE to create a call-back window to enable the VxD interface DLL 438 to receive status change messages. The creation and destruction of this window are handled entirely within the VxD interface DLL 438 itself. If the VxD interface DLL 438 receives a command HW_RegisterServerProcess (HW_TSPCALLBACK CallBackAddress), which is issued by the HW_TSP_IFC object 434 upon initialization, the VxD interface DLL 438 registers the current Windows process as the server process for the VxD interface DLL 438. The command includes a call-back address to a portion of the memory 734 (FIG. 7) to which the async VxD 428 can report asynchronous messages, including status change alerts from the CIU 102. This provides asynchronous event processing for the TSP 426. A command HW_RemoveServerProcess( ) removes the current process as a server process for the VxD interface DLL 438.

Based on the messages posted to the call-back window, the TAPIEXE.EXE routine calls the TSP 426 to handle the events posted.

TSP DEVICE OBJECT

Figure 12:
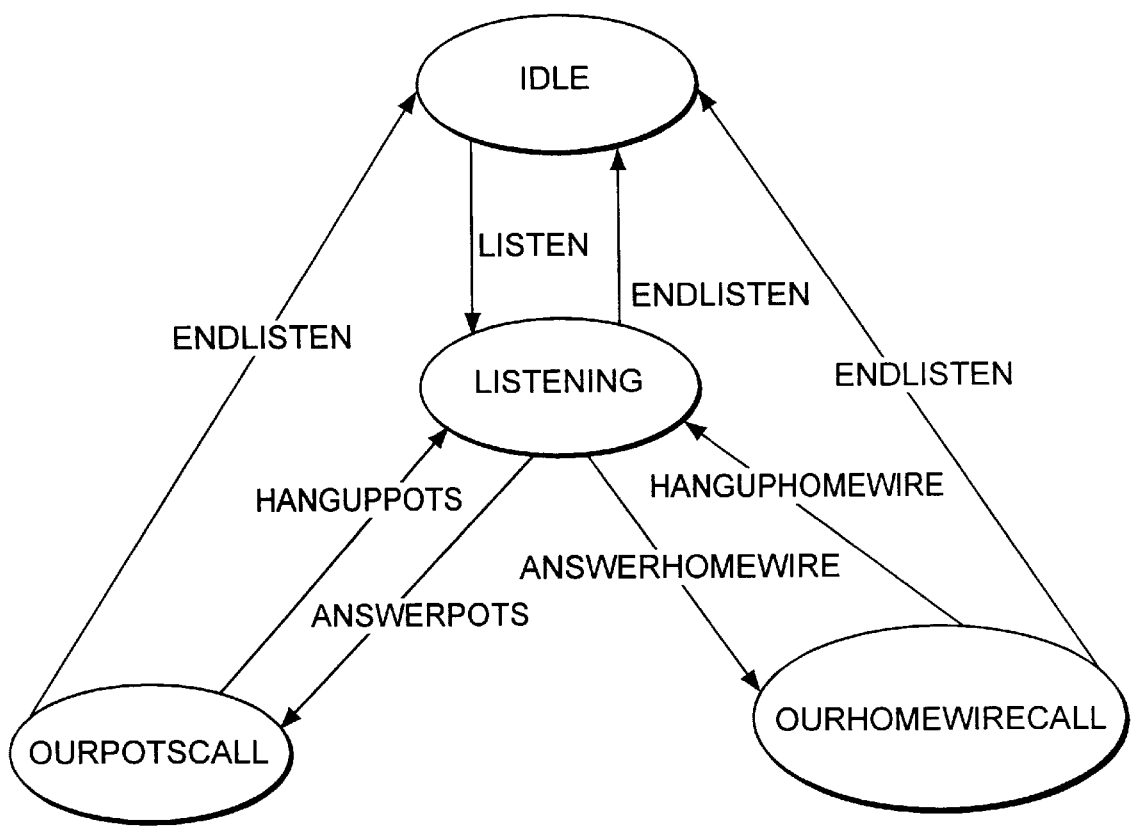
FIG. 12 is a state diagram of a device object in the TAPI service provider of FIG. 11.

Referring to FIG. 12, the HW_DEVICE object 436, described in greater detail, includes a state machine that can be in one of four states: Idle; Listening; OurPotsCall; and OurHomewireCall. The behavior of the HW_DEVICE state machine is controlled by methods called by the HW_TSP_IFC object 434. The HW_DEVICE state machine starts out in the Idle state. If the HW_DEVICE state machine receives the Listen method from the HW_TSP_IFC object 434, it transitions to the Listening state where it awaits a command from the HW_TSP_IFC object 434 to pick up a POTS call (AnswerPots), pick up a Homewires call (AnswerHomewire), or transition back to the Idle state (EndListen). If the HW_DEVICE state machine receives the AnswerPots method in the Listening state, it transitions to the OurPotsCall state, where the TSP 426 takes the POTS call. In the OurPotsCall state, if a HangUpPots method is received, the HW_DEVICE state machine transitions back to the Listening state.

If the HW_DEVICE state machine receives a AnswerHomewire method from the HW_TSP_IFC object 434 in the Listening state, the state machine transitions to the OurHomewireCall state, where the TSP 426 handles a Homewires call. The method HangUpHomewire causes the state machine to transition back to the Listening state.

If the HW_DEVICE state machine receives the method EndListen from any state, it returns back to the Idle state where it stops monitoring the communication line for either POTS or Homewires calls.

Figure 13:
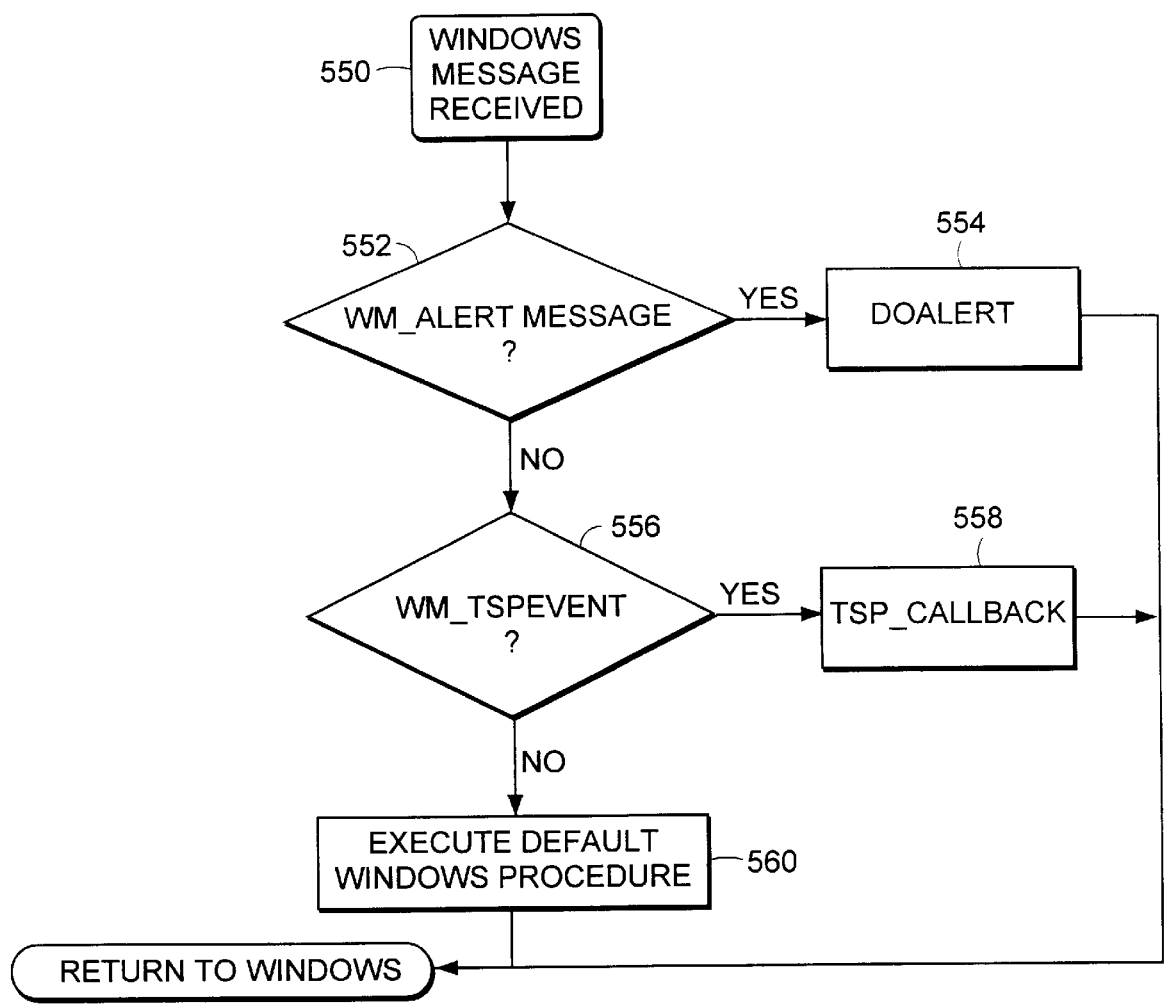
FIG. 13 is a flow diagram of a routine in the device object of FIG. 12.

Referring to FIG. 13, the HW_DEVICE object 436 includes a "hidden window" main routine that handles messages posted to the call-back window by the async VxD 428. One of the messages is a Windows alert (WM_Alert) event, which occurs when the async VxD 428 posts a message to the call-back window. If the hidden window main routine receives, at 550, a Windows message, it checks, at 552, to determine if a WM_Alert event is received. If so, the hidden window main routine executes, at 554, a DoAlert routine, which reads the call-back window for new status information posted by the async VxD 428. In response to the posted messages, if the HW_TSP_IFC object 434 needs to be notified, the DoAlert routine sends a notification message to the HW_TSP_IFC object 434 by posting a TAPI event to the hidden window (WM_TSP event). At a later time, the hidden window main routine will call the HW_TSP_IFC object 434 to service the posted event.

The DoAlert routine serves as a "one-message delay" buffer for events that must bubble up to the HW_TSP_IFC object 434. Thus while the DoAlert routine is handling the alert message from the async VxD 434, it holds off handling of any WM_TSP event it posts. If the DoAlert routine calls the HW_TSP_IFC object 434 to handle the WM_TSP event, the HW_TSP_IFC object 434 may need to loop back and send a method down to the HW_DEVICE object 436 in response. If that happens, then processing of the WM_TSP event will interfere with processing of the WM_Alert event. Thus each message is processed completely and control returns to Windows before the HW_DEVICE object processes another message.

If the hidden window main routine receives, at 556, a WM_TSP event, the main routine executes, at 558, the TSP_CallBack routine, which calls the HW_TSP_IFC object 434 to handle the posted event.

If the received Windows message is not a WM_Alert event or a WM_TSP event, then the hidden window main routine invokes, at 560, the default Windows procedure to handle the event before returning to Windows.

Figure 14:
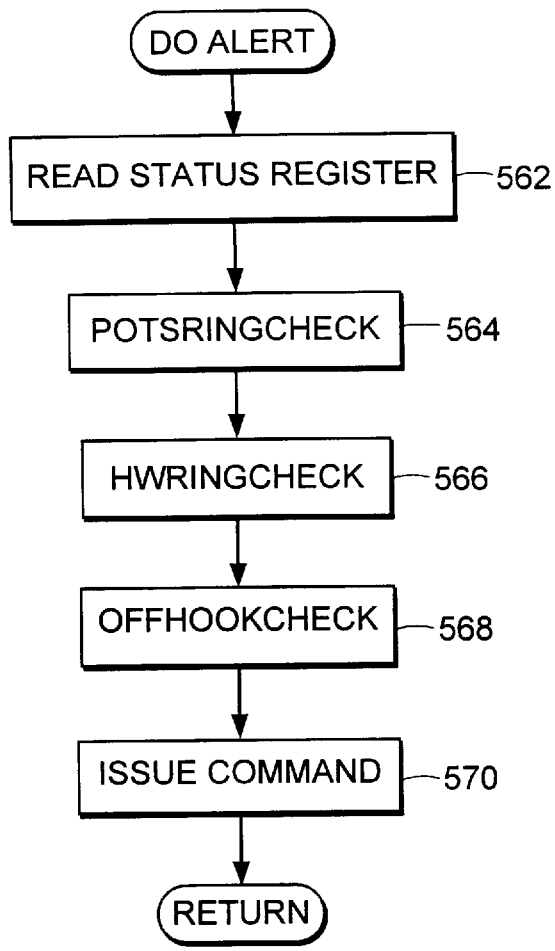
FIG. 14 is a flow diagram of a alert subroutine in the device object of FIGS. 12 and 13.

Referring to FIG. 14, the DoAlert routine called by the hidden window main routine is described in greater detail. The DoAlert routine first issues, at 562, a ReadStatusRegister command for reading the current status, which is in the form of the status packet CIU_Status stored by the async VxD 428. The CIU_Status packet is the contents of the status register 352 transmitted to the async VxD 428. Next, the DoAlert routine executes, at 564, a PotsRingCheck routine to check if the status register 352 is indicating a received ring signal. If the PotsRingCheck routine detects that the received ring is not a false ring, it issues a PotsRing event to the call-back window for processing by the HW_TSP_IFC object 434.

The DoAlert routine next executes, at 566, an HWRingCheck routine to determine if a Homewires ring is detected (that is, a PIU-connected telephone is off-hook). If the HWRingCheck routine determines that the Homewires ring is not a false ring, it posts the HWRing event to the call-back window. Next, the DoAlert routine executes, at 568, a routine OffHookCheck to determine if a telephone has been taken off-hook on the telephone line 130. The OffHookCheck routine issues an OffHook event, an OnHook event, or a Flash Detect event depending on when the off hook status is detected, as discussed in FIG. 17 below. Finally, the DoAlert routine issues, at 570, a command to the CIU firmware based on the current state of the HW_DEVICE object 436.

Figure 15:
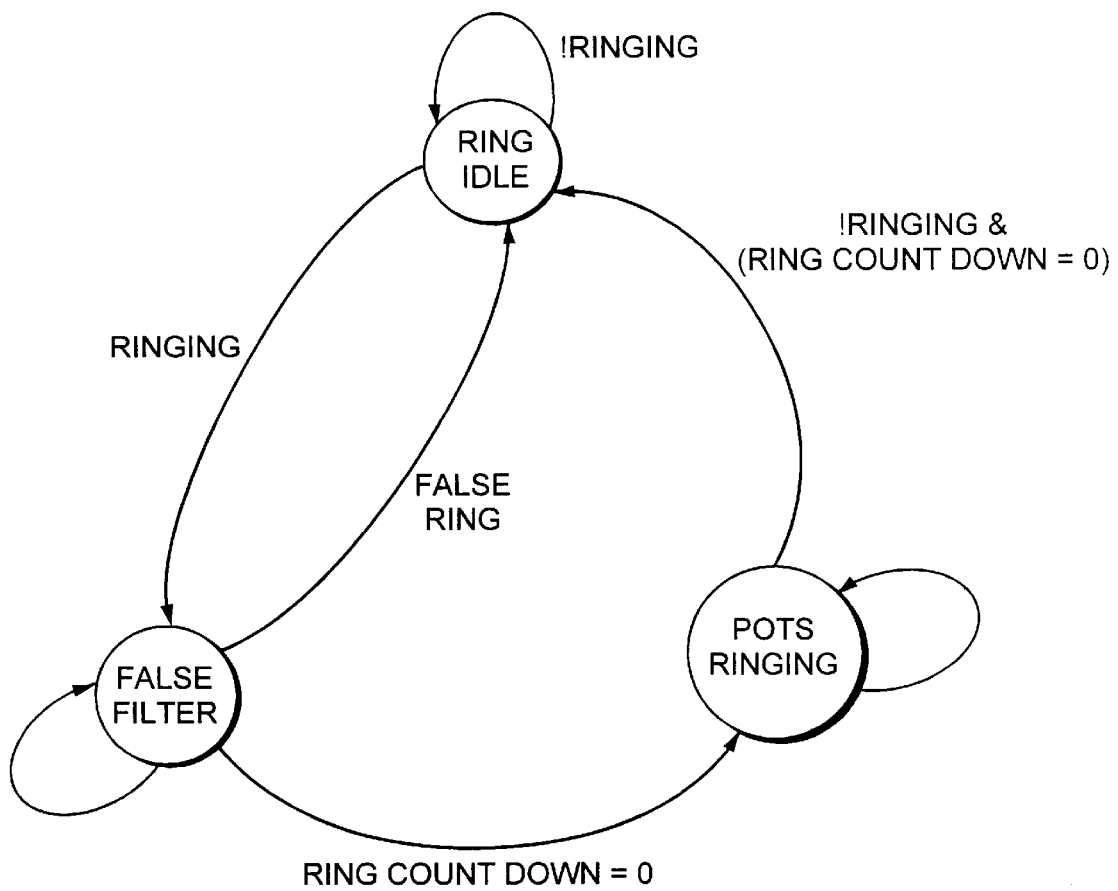
FIGS. 15, 16, and 17 are state diagrams of subroutines called by the alert subroutine of FIG. 14.
Figure 16:
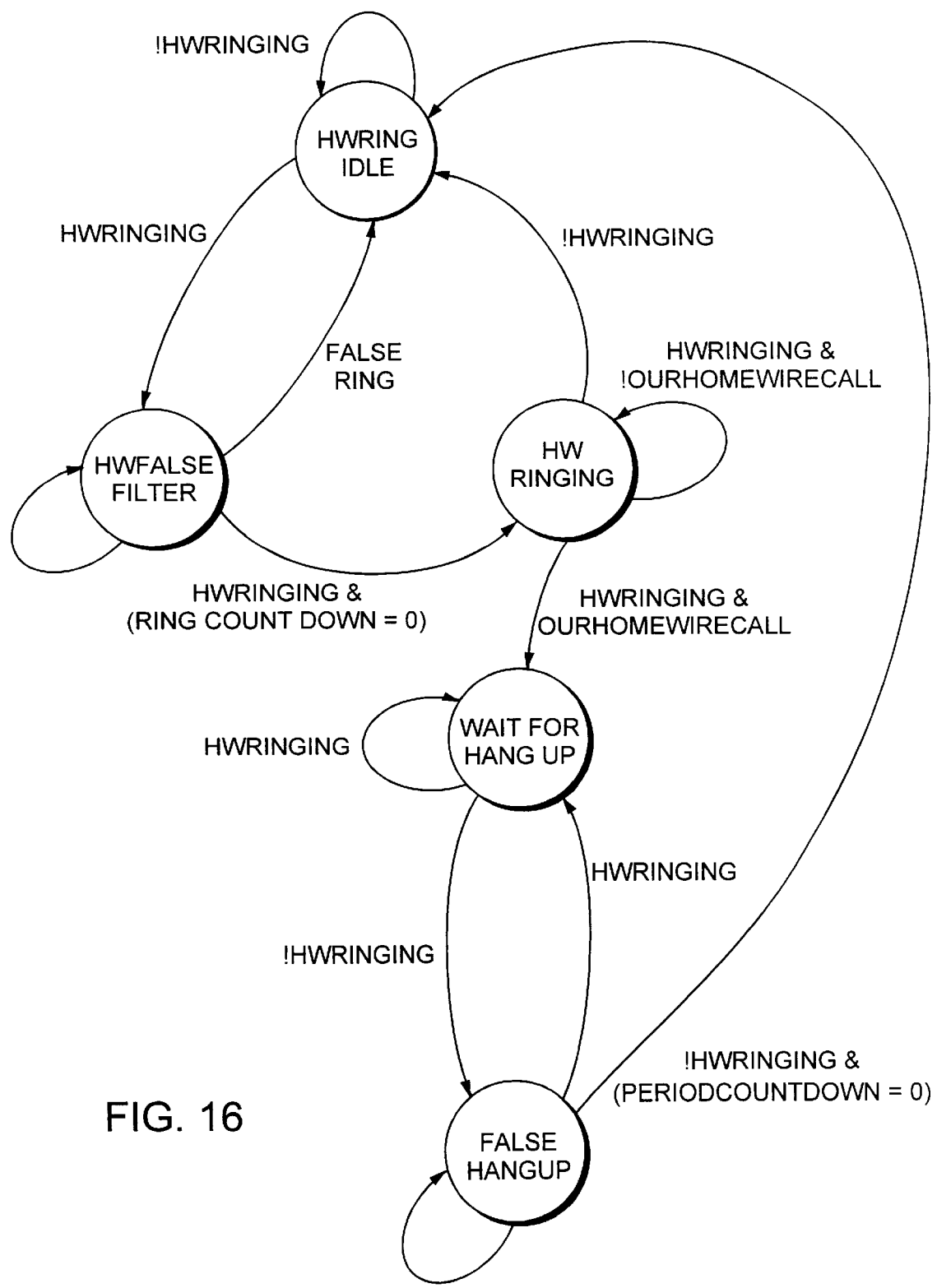
Figure 17:
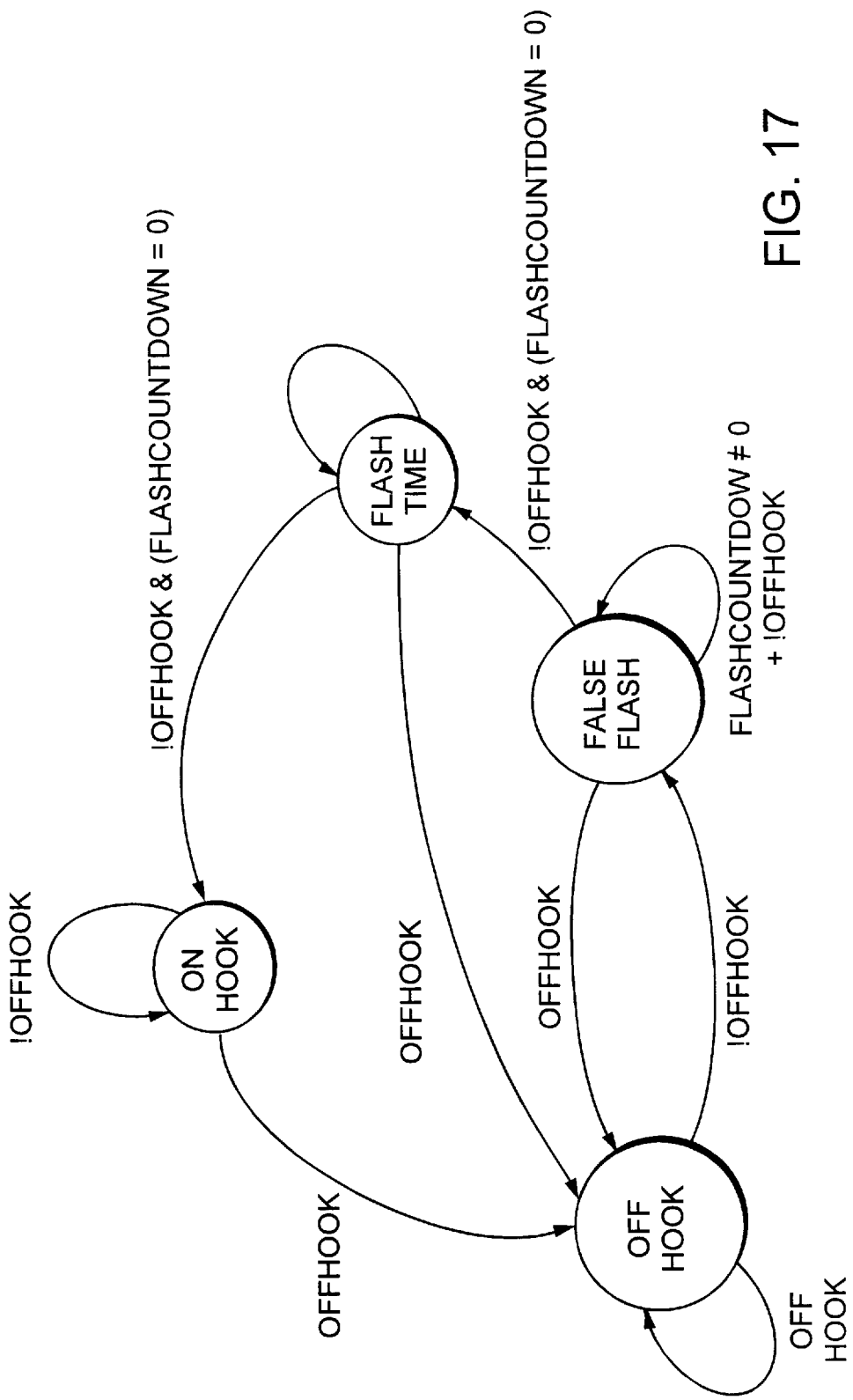

FIGS. 15, 16, and 17 show the PotsRingCheck, HWRingCheck, and OffHookCheck routines, respectively, in greater detail.

Referring to FIG. 15, the PotsRingCheck routine includes a state machine which starts in a RingIdle state, where it remains while a bit RINGING is cleared low. The RINGING bit corresponds to the RINGDET bit of the status register 352 in the microcontroller 340. If the PotsRingCheck determines that the RINGING bit is true, the PotsRingCheck routine transitions to the FalseFilter state to ensure that a false ring was not detected due to transient noise on the telephone line 130. The PotsRingCheck routine waits in the FalseFilter state while a count variable, RingCountDown, decrements from an initial debounce value (for example, 500 ms). If the RINGING bit is cleared before the RingCountDown reaches zero, then a false ring was received and the PotsRingCheck routine transitions back to the RingIdle state. Thus, effectively, the PotsRingCheck routine debounces an incoming ring signal to ensure that only a true ring is forwarded to the HW_TSP_IFC object 434.

If RingCountDown decrements to zero, and the RINGING bit is still true, the PotsRingCheck routine checks to determine if the HW_DEVICE state machine is in the Listening state, and if true, a method LetPotsRingThrough is invoked to set the value of the Homewires ring counter 354 in the microcontroller 340 to 1 to allow all incoming rings to ring through. The routine also posts a PotsRing event to the call-back window for later processing by the HW_TSP_IFC object 434. The PotsRingCheck routine then transitions to the PotsRinging state.

In the PotsRinging state, the PotsRingCheck routine loads the count variable, RingCountDown, with a time-out value (corresponding to for example, 8 seconds), which is the time-out period for the next ring must arrive. If the bit RINGING is not asserted again and the RingCountDown variable counts down to zero, then the call was missed (for example, the external caller hung up). The PotsRingCheck routine posts a PotsCallMissed event to the call-back window and transitions back to the RingIdle state. However, if the RINGING bit is asserted again within the time-out period, the PotsRingCheck routine remains in the PotsRinging state.

Referring to FIG. 16, the HWRingCheck routine includes a state machine which starts in the HWRingIdle state, where it waits for the assertion of a bit HWRinging. The bit HWRinging corresponds to the CXD_ signal from the microcontroller 340, and it is maintained high if the CIU firmware detects a PIU carrier. If an active HWRinging bit is received, the HWRingCheck routine initializes a variable, PeriodCountDown, to an initial value (corresponding to, for example, 500 ms) and transitions to the HWFalseFilter state to ensure that a false carrier was not detected. In state HWFalseFilter, the variable, PeriodCountDown, is decremented. If a false carrier was detected, that is, the bit HWRinging goes away before the variable PeriodCountDown decrements to zero, the HWRingCheck routine transitions back to the HWRingIdle state. However, if the bit HWRinging remains active and the variable PeriodCountDown decrements to zero (indicating that 500 ms has passed), then a true carrier detect has been received, and the HWRingCheck routine posts a HWRing event to the call-back window for later processing by the HW_TSP_IFC 434, resets the variable PeriodCountDown to a ring period value (corresponding to, for example, 4 seconds), and transitions to the HWRinging state.

One objective of the HW_DEVICE object 436 is to present a Homewires ringing signal to the HW_TSP_IFC object 434 even though the carrier detect bit HWRing is steadily high. Thus, the HWRing event is posted to the call-back window for processing by the HW_TSP_IFC object 434 once every ring period (which is set at about 4 seconds) while the bit HWRinging is high.

In the HWRinging state, if the bit HWRinging is true and the HW_DEVICE state machine is in the OurHomewireCall state (indicating that the Homewires call has been picked up by the HW_TSP_IFC object 434), the HWRingCheck routine transitions to the WaitForHangUp state to wait for the current Homewires call to end. The routine remains in the WaitForHangUp state until the bit HWRinging is deasserted, whereupon the routine reloads the count variable PeriodCountDown with a debounce value (corresponding to, for example, 500 ms) and transitions to the FalseHangUp state. This ensures that a false hang-up was not detected due to RF noise. In the FalseHangUp state, if the HWRingCheck routine detects that the bit HWRinging is high again before the variable, PeriodCountDown, counts to zero, it returns to the WaitForHangUp state. Otherwise, if the bit HWRinging is deasserted and the variable PeriodCountDown counts to zero, the HWRingCheck routine posts an HWRemoteDisconnect event and returns to HWRingIdle state.

In the HWRinging state, if the bit HWRinging is asserted but the HW_DEVICE state machine is not in the OurHomewireCall state, the HWRingCheck routine decrements the variable PeriodCountDown, issues a HWRing event when the variable counts down to zero, resets the variable to the ring period value, decrements the variable again, and so forth, until the bit HWRinging is deactivated. This simulates the behavior of a telephone ringing signal even though the carrier detect signal CXD_ is maintained high. When the bit HWRinging is deactivated before the HW_DEVICE state machine could reach the OurHomewiresCall state, the HWRingCheck routine posts an HWCallMissed event to the HW_TSP_IFC object 434 to indicate a call has been missed and returns to the HWRingIdle state.

Referring to FIG. 17, the OffHookCheck routine includes a state machine which begins in the OnHook state, where it remains while the a bit OffHook remains deasserted. The bit OffHook corresponds to the signal OFFHOOK in the CIU 102. If the bit OffHook is asserted, the OffHookCheck routine posts an OffHook event and transitions to the Off-Hook state. The OffHookCheck routine remains in the OffHook state while the bit OffHook is asserted high. In the OffHook state, a count variable, FlashCountDown, is set to a false-flash period (for example, 250 ms). When the bit OffHook is negated low, the OffHookCheck routine transitions to the FalseFlash state to ensure that a false flash-hook was not detected, that is, the flash was detected for less than the false-flash period. If the bit OffHook is set high before the variable FlashCountDown decrements to zero, the OffHookCheck routine transitions back to the OffHook state. If the variable FlashCountDown reaches zero and the bit OffHook remains low, then the routine transitions to the FlashTime state and the variable, FlashCountDown, is set to a flash period (for example, one second) for determining if a flash-hook was received. In the FlashTime state, the count variable, FlashCountDown, is decremented while the bit OffHook remains low. If the variable FlashCountDown counts down to zero, then the telephone has really been placed back on hook and the OffHookCheck routine posts an OnHook event to the call-back window for processing by the HW_TSP_IFC object 434 and transitions back to the OnHook state. However, if the bit OffHook is set high again before expiration of FlashCountDown, the OffHookCheck routine transitions back to the OffHook state and posts a Flash Detect event to the HW_TSP_IFC object 434.

VIRTUAL DEVICE DRIVER

Figure 18A:
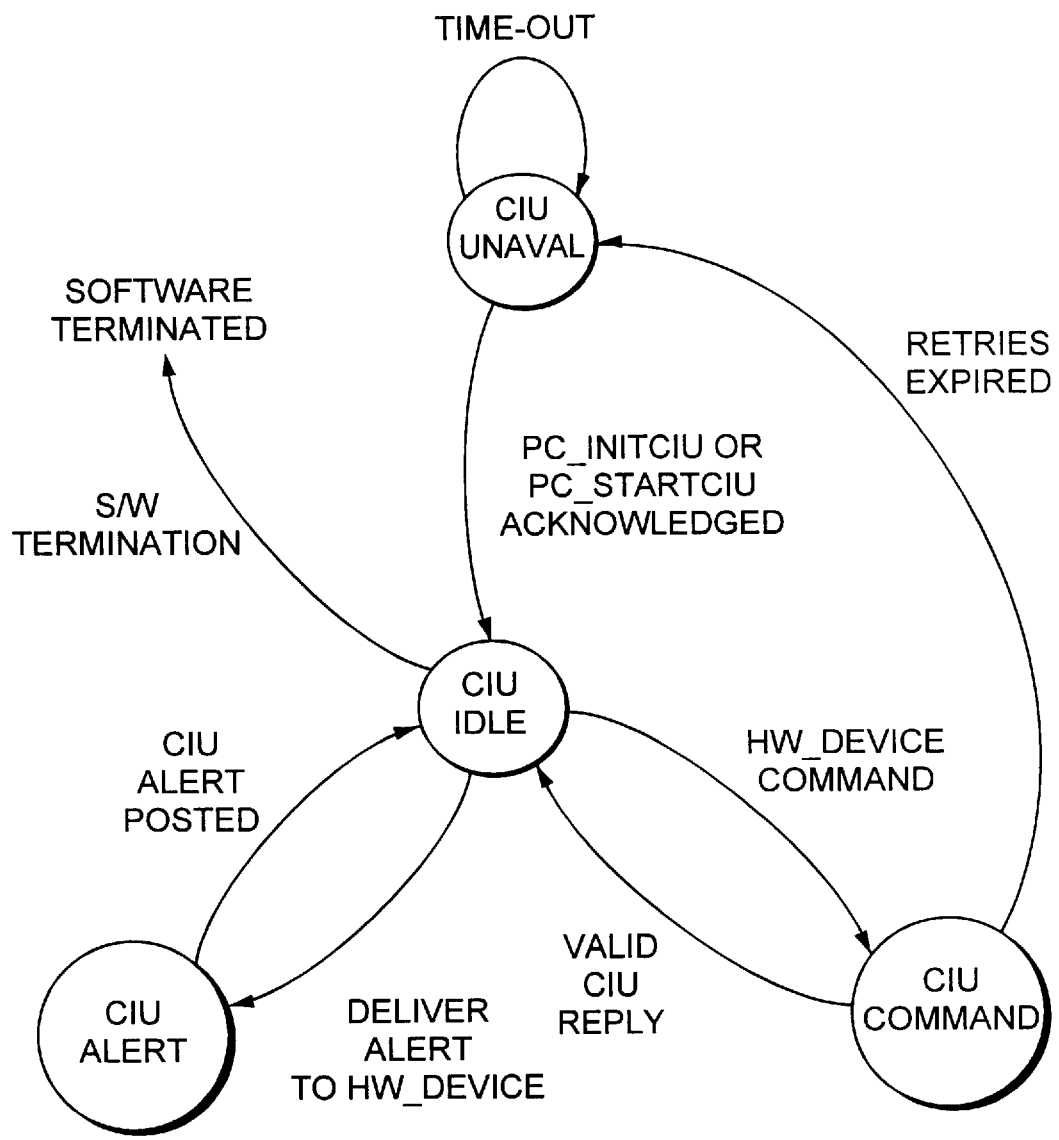
FIG. 18A is a state diagram of a state machine in an asynchronous virtual device driver which is the interface between the computer interface unit of FIG. 6 and the device object of FIG. 12.

The async VxD 428 provides a low overhead packet protocol interface to the standard Windows 95 VCOMM import services. The async VxD 428 performs the following functions: sets up buffering for calls to the port; provides command and control for wave input/output; breaks the information stream into a command stream and data stream; and handles all VCOMM interrupts. The async VxD 428 provides the direct hardware interface to the CIU 102 and notifies the TSP 426 about hardware status change events. Referring to FIG. 18A, the async VxD 428 includes a state machine that initializes in the CIU_UNAVAIL state, in which the async VxD 428 issues a PC_InitCIU or PC_StartCIU method to the CIU firmware to establish a connection. The PC_InitCIU method is issued when the async VxD 428 is initially powered up. The PC_StartCIU method is issued while the async VxD 428 is otherwise active but needs to establish a communications link with the CIU 102 (such as after it had previously shut down the link).

After the PC_InitCIU or PC_StartCIU method is transmitted, the async VxD 428 expects to receive a response from the CIU 102 within a time-out period (for example, 1500 ms). If the time-out expires, the async VxD 428 remains in the CIU_UNAVAIL state. However, if the CIU firmware responds with its CIU status message, then the async VxD 428 transitions to the CIU_Idle state.

From the CIU_Idle state, the async VxD 428 transitions to the CIU_Command state if it receives a command from the HW_DEVICE object 436. In state CIU_Command, the HW_DEVICE command is translated to an async VxD command (FIG. 9B) and issued to the CIU 102. Upon transmission of the command, a retry timer is started. After a time-out period (for example, 1500 ms) without a response from the CIU 102, the async VxD 428 will re-issue the command and the retry timer is incremented. After a certain number of retries (for example, 5 retries), the async VxD 428 will conclude that the connection to the CIU 102 has somehow been lost and return to the CIU_UNAVAIL state. If a valid reply is received from the CIU 102, then the async VxD 428 transitions back to the CIU_Idle state.

A state change in the CIU 102 (for example, carrier detected, off-hook detected, line seized, ring detected) will cause the CIU firmware to send an alert to the computer system 100. If the async VxD 428 receives the alert, it transitions to the CIU_Alert state, in which the VxD 428 posts an alert event to the call-back window. After the event is posted, the async VxD 428 returns to the CIU_Idle state. To report the alert to the TSP 426, the async VxD 428 posts a Windows message to notify the VxD interface DLL 438 that status has changed. The call-back routine is a memory resident routine which cannot call any Windows functions except PostMessage.

Finally, if the async VxD 428 receives the Software_Termination message from the operating system to shut it down, the async VxD 428 issues a PC_GoInactive command to the CIU 102 to shut the CIU 102 down.

Referring to FIG. 18B, the async VxD 428 maps methods from the HW_DEVICE object 436 to control commands to the CIU firmware. The method AnswerPots is mapped to the command PC_SeizeLine for the CIU 102 to seize the line 130. The method HangUpPots maps to the command PC_UnseizeLine for the CIU 102 to release the line 130. The method AnswerHomewire maps to the command PC_HWCallAck, which informs the CIU firmware that the TSP 426 has accepted the Homewires call. The method HangUpHomewire maps to the command PC_DropCIUCarrier, which causes the CIU 102 to turn off the CIU carrier. The method Listen maps to the command PCSetMonitorMode (on), which informs the CIU 102 that it should inform the computer system 100 of status changes. The method EndListen maps to the command PCSetMonitorMode(off), which informs the CIU 102 not to alert the computer system 100 about status changes as the TSP 426 is no longer monitoring for status changes. The method ReadRingCount maps to the command PC_GetRingRollover to retrieve the current value of the Homewires ring counter 354 in the microcontroller 340. The method SetRingCount maps to the command PC_SetRingRollover to set the initial value of the Homewires ring counter 354.

The async VxD 428 expects the CIU 102 to return an acknowledge message if the command was successfully received. For all the commands except PC_GetRingRollover, the expected message is the status packet CIU_Status from the status register 352 in the microcontroller 340. For the command PC_GetRingRollover, the expected message is the current value of the Homewires ring counter 354.

Referring to FIG. 18C, messages passed from the CIU 102 to the async VxD 102 are mapped as notification events from the HW_DEVICE object 436 to the TSP. If the CIU_Status message reports a status change of PIU carrier detected (that is, the CXD_ bit is set low), then the HW_DEVICE object 436 posts a HWRing event to the HW_TSP_IFC object 434 when it becomes aware of the status. Similarly, a status change to no PIU carrier detected causes one of the events HWCallMissed, HWRemoteDisconnect, or FlashDetect to be posted by the HW_DEVICE object 436. A status change to off-hook detected causes the event PotsOffHookDetect to be posted. A status change of no off-hook detected causes both events PotsOnHookDetect and HWRemoteDisconnect to be posted. The alert message CIU_Alert_Info(ring available) indicates a ring has been received and causes the async VxD 428 to issue a PC_ClearRingTrigger (resetting the failsafe ring counter 356) to acknowledge receipt of the alert. This alert is forwarded to the HW_DEVICE object 436, which responds by posting the PotsRing event to the HW_TSP_IFC 434. The alert message CIU_Alert_Info(status changed) indicates that the status has changed and triggers the async V×D 428 to issue the command PC_Get_Status to retrieve the status message CIU_Status.

TSP INTERFACE OBJECT

The HW_TSP_IFC object 434 includes a Homewires control state machine for handling Homewires calls and a POTS control state machine for handling POTS calls. The HW_TSP_IFC object 434 receives TAPI commands from the TAPI.DLL 430, which issues the commands in response to commands from the data flow manager 420 that is monitoring the communications line. Effectively, the HW_TSP_IFC object 434 can be thought of as providing two TAPI lines: a Homewires line and a POTS line. The two TAPI lines are monitored by the data flow manager 420.

Figure 19A:
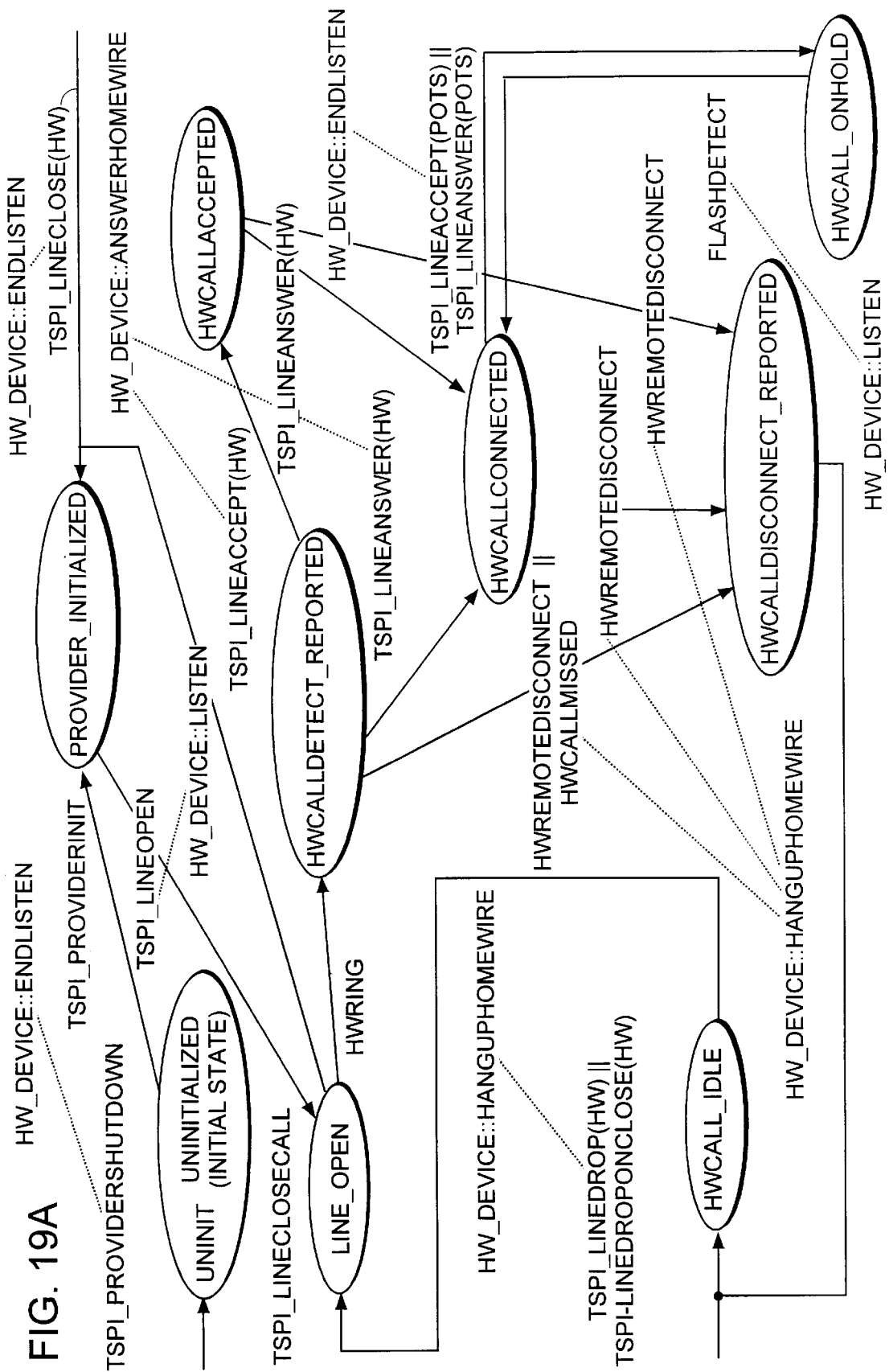
FIGS. 19A and 19B are state diagrams of state machines in a TAPI service provider object of the TAPI service provider of FIG. 11.

Referring to FIG. 19A, the Homewires control state machine powers up in the initial state UNINIT. A shutdown method TSPI_ProviderShutdown from the TAPI.DLL 430 causes the Homewires control state machine (HW control state machine) to issue the EndListen method to the HW_DEVICE object 436 and to transition to the UNINIT state.

When the TAPI.DLL 430 is initiated, it issues a method TSPI_ProviderInit, which causes the HW control state machine to issue the method Listen to the HW_DEVICE object and to transition to the Provider_Initialized state. Additionally, receipt of a method TSPI_LineClose(HW) also causes the HW control state machine to transition to the ProviderInitialized state. Typically, the command TSPI_LineClose(HW) is issued while the HW control state machine is in the LineOpen state in response to the ENDLISTEN method.

The method TSPI_LineClose(HW) indicates that the speech recognizer program 408 currently monitoring the Homewires TAPI line wants to shut down the communication line and stop monitoring the line. The HW_TSP_IFC object 434 then issues the method Endlisten to notify the CIU firmware that the TSP 426 has stopped monitoring the line and need not be alerted about status changes.

If a TSPI_LineOpen(HW) method is received, the HW control state machine transitions to the LineOpen state and issues the Listen method to the HW_DEVICE object 436. The data flow manager 420 issues the TSPI_LineOpen method if it wants to start monitoring the Homewires line. In the LineOpen state, the HW state machine waits for a HWRing event.

In the LineOpen state, if an HWRing event is detected from the HW_DEVICE object 436 (that is, the user has picked up a PIU-connected telephone), the HW control state machine transitions to the HWCallDetectReported state. In this state, the HW control state machine waits for the data flow manager 420 to determine whether to accept the Homewires call. If the Homewires call is accepted but the appropriate speech control script has not been invoked yet by the command management program 410, the data flow manager 420 issues the TSPI_LineAccept method, causing the HW control state machine to transition to the HWCallAccepted state to wait for the appropriate speech control script to begin operation. The method AnswerHomewire is issued by the HW control state machine to the HW_DEVICE object to answer the Homewires call.

When the speech control script is ready, the data flow manager 420 issues the TSPI_LineAnswer command, and the HW control state machine transitions to the HWCallConnected state from either state HWCallDetectReported or HWCallAccepted. In the HWCallConnected state, a speech control script in the command management program 410 (through the data flow manager 420) communicates with the user on a PIU-connected telephone through the MMSYSTEM.DLL 423 and the wave driver file 424.

The TAPI HWRemoteDisconnect event is transmitted to the HW_TSP_IFC object 434 in response to the user hanging up while a Homewires call (from a PIU-connected telephone) is in progress. The HWRemoteDisconnect event is also transmitted if a non-PIU phone is lifted, which causes the CIU 102 to shut off its CIU carrier. If the HW control state machine receives the HWRemoteDisconnect event from the HW_DEVICE object, it transitions to the HWCallDisconnectReported state from the HWCallDetectReported, HWCallAccepted, or HWCallConnected state. This causes the method HangUpHomewire to be issued to the HW_DEVICE object. In addition, from the HWCallDetectReported state, receipt of the event HWCallMissed from the HW_DEVICE object will cause the HW control state machine to transition to the HWCallDisconnectReported state, which indicates that even though the HWRing event was received, the PIU-connected telephone has hung up. In response to the HWRemoteDisconnect event, the data flow manager 420 issues a LineDrop(HW) method to drop the Homewires line. The HW control state machine then transitions to the HWCallIdle state.

A LineDropOnClose (HW) method can also be issued by the data flow manager 420 (for example, in response to a user-entered command from the keyboard, mouse or other user interface) to drop the Homewires line (if active). The LineDropOnClose(HW) method also causes the HW control state machine to transition to the HWCallIdle state from any other state.

In transitioning to the HWCallIdle state, the HangUpHomewire method is issued to the HW_DEVICE object 436. From the HWCallIdle state, the HW control state machine transitions to the LineOpen state if the TAPI.DLL 430 issues the TSPI_LineCloseCall(HW) command to close a current Homewires call session, that is, data structures allocated to the call are deallocated from memory.

If an incoming POTS call is detected while a Homewires call is in progress (that is, the system is in the HWCallConnected state), a user on a PIU-connected phone can instruct the communication software that the user wants to answer the call or have the communication software answer the call by voice-mail. In response the TAPI.DLL 430 issues a TSPI_LineAccept(POTS) or a TSPI_LineAnswer(POTS) to allow the communication software to answer the incoming call. The HW control state machine then transitions to the HWCallOnHold state and issues the Endlisten method to the HW_DEVICE object 436 to shut off the CIU carrier, thereby allowing the PIUs to connect their respective telephones to the telephone line 130 for POTS calls. The HW_TSP_IFC object 434 also posts a TAPI OnHold message to the data flow manager 420 when it enters the HWCallOnHold state. The HW state machine remains in the HWCallOnHold state until it detects a FlashDetect event (the user wants to go back to the Homewires call). In response to the Flash Detect event, HW state machine issues the Listen method to re-enable the CIU carrier, which effectively returns the line to the Homewires call that was placed on hold. The HW state machine then transitions back to the HWCallConnected state.

Figure 19B:
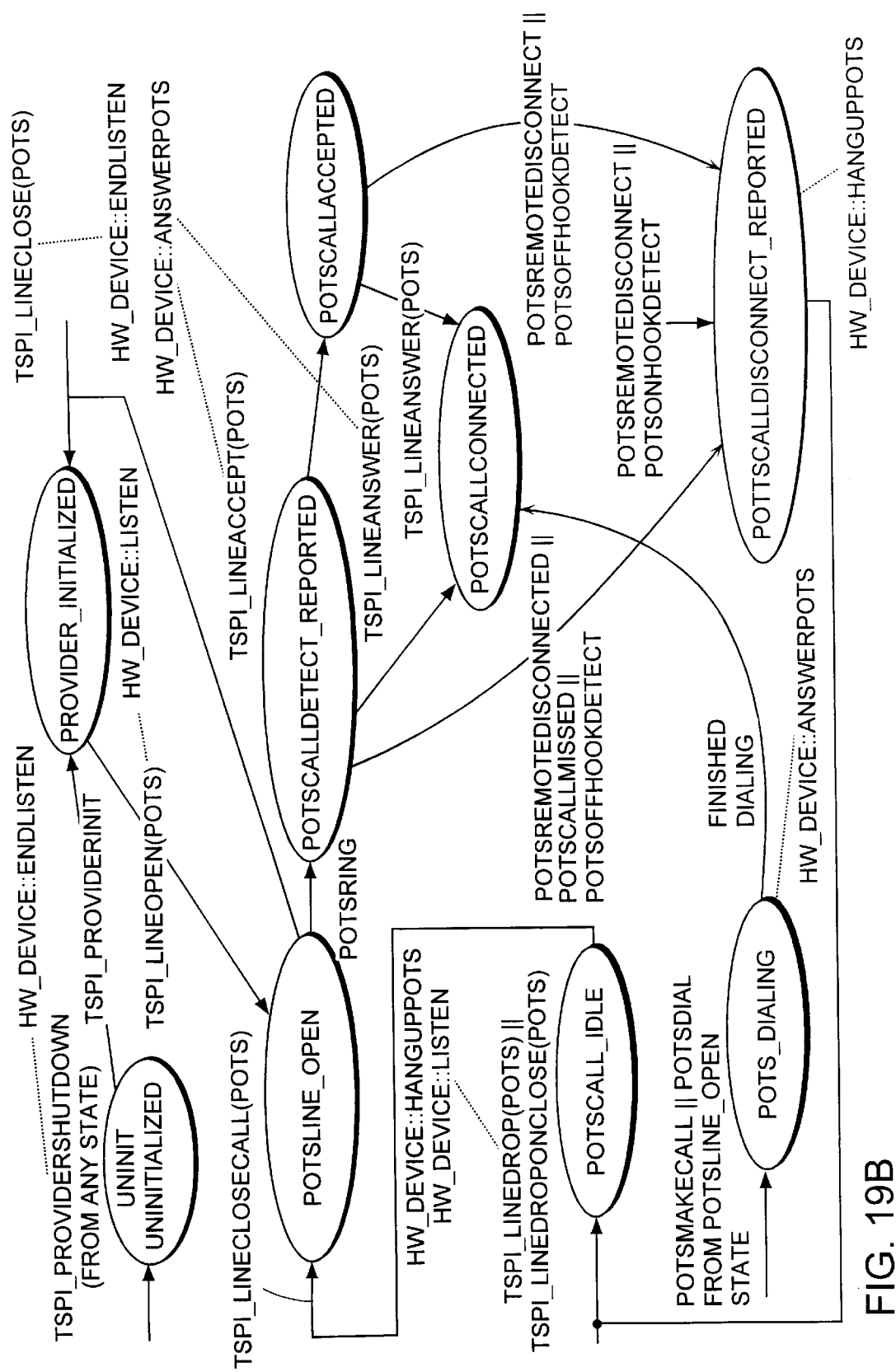

Referring to FIG. 19B, the POTS control state machine of the HW_TSP_IFC object 434 starts in state UNINIT after power-up or transitions to the state in response to the TSPI_ProviderShutdown command. Upon receipt of the TSPI_ProviderInit command, the POTS control state machine transitions to the ProviderInitialized state. Receipt of a method TSPI_LineClose (POTS) also causes the POTS control state machine to transition to the ProviderInitialized state. Typically, the TSPI_LineClose(POTS) method is issued when the POTS control state machine is in a PotsLineOpen state.

The method TSPI_LineClose(POTS) indicates that the data flow manager 420 currently monitoring the POTS TAPI line wants to stop monitoring the line. The HW_TSP_IFC object 434 then issues the method EndListen to notify the CIU firmware that the TSP 426 has stopped monitoring the line and need not be alerted about status changes.

If a TSPI_LineOpen(POTS) method is received, the POTS control state machine transitions to the PotsLineOpen state and issues the Listen method to the HW_DEVICE object 436. The data flow manager 420 issues the TSPI_LineOpen(POTS) method if it wants to start the monitoring the POTS line. In the PotsLineOpen state, the TSP 426 waits for a PotsRing event.

In the PotsLineOpen state, if a user issues a command (from a PIU-connected telephone) during a Homewires call to the command management program 410 to dial an external number, the command management program 410 causes the data flow manager 420 to issue a command PotsMakeCall (to enable the DTMF generator to make a call), which causes the POTS control state machine to issue the AnswerPots command (to notify the CIU firmware to seize the line 130) and to transition from the PotsLineOpen state to the PotsDialing state. Following the PotsMakeCall method, the data flow manager 420 next issues a PotsDial method to start the DTMF generator dialing a number. After the DTMF generator has finished dialing, the POTS control state machine transitions to the PotsCallConnected state.

In the PotsLineOpen state, if a PotsRing event is detected from the HW_DEVICE object 436 (that is, an incoming call is present), the POTS control state machine transitions to the PotsCallDetectReported state. In the transition, if the HW control state machine is not in the HWCallConnected state, then the POTS control state machine issues the EndListen method to the HW_DEVICE object 436 to stop monitoring for a Homewires call.

In the PotsCallDetectReported state, the POTS control state machine waits for the data flow manager 420 to determine whether to accept the POTS call. If the external user hangs up, and the ring goes away, then the event PotsCallMissed is posted by the HW_DEVICE object, causing the HW control state machine to transition to the PotsCallDisconnectReported state. If the POTS call is accepted but the appropriate speech control script has not been invoked yet, the data flow manager 420 issues the TSPI_LineAccept(POTS) command and the POTS control state machine transitions to the PotsCallAccepted state to wait for the appropriate speech control script to begin operation. The method AnswerPots is issued by the POTS control state machine to the HW_DEVICE object to answer the POTS call.

When the speech control script is ready, the data flow manager 420 issues the TSPI_LineAnswer(POTS) command, and the POTS control state machine transitions to the PotsCallConnected state from either of states PotsCallDetectReported or PotsCallAccepted. In the PotsCallConnected state, a speech control script in the command management program 410 communicates with the external caller through the data flow manager 420. If, however, a user answers the call by picking up a telephone on the telephone line 130, then a PotsOffHookDetect is transmitted to the POTS control state machine, which transitions directly to the PotsCallDisconnectReported state directly from either the PotsCallDetectReported or the PotsCallAccepted state. (This allows the computer to hang up the call while the user stays on the line).

The TAPI PotsRemoteDisconnect event is transmitted to the HW_TSP_IFC object 434 in response to the external user hanging up during the POTS call and the CIU firmware detecting a dial tone. If the POTS control state machine receives the PotsRemoteDisconnect event from the HW_DEVICE object 436, it transitions to the PotsCallDisconnectReported state from the PotsCallDetectReported, PotsCallAccepted, or HWCallConnected state. This causes the method HangUpPots to be issued to the HW_DEVICE object to hang up the POTS call. In response to the PotsRemoteDisconnect event, the data flow manager 420 issues a LineDrop(POTS) method to drop the POTS line. In response to the LineDrop(POTS) method, the POTS control state machine transitions to the PotsCallIdle state from the PotsCallDisconnectReported state.

A LineDropOnClose(POTS) method can also be issued by the data flow manager (for example, in response to a user-entered command from the keyboard, mouse, or other user interface) to drop the POTS line (if active), which causes the Pots control state machine to transition to the PotsCallIdle state from any state.

In the transition to the PotsCallIdle state, the POTS control state machine issues the HangUpPots method to the HW_DEVICE object 436. From the PotsCallIdle state, the POTS control state machine transitions to the PotsLineOpen state if the data flow manager 420 issues the TSPI_LineCloseCall(POTS) method to close a current POTS call. The POTS control state machine also issues the Listen method to the HW_DEVICE object 436 to begin monitoring the line again.

Other embodiments are within the scope of the following claims. For example, different voltage amplitude levels can be used to define the presence of the bias voltage, ringing voltage, or first carrier. Different frequencies can be defined for the ringing voltage and the first and second carriers.

What is claimed is:

1. A method of communicating information in a telephone system connected to an external phone line, the telephone system having a telephone line, a telephone, a phone interface unit coupled to the telephone and the telephone line, a computer system, and a computer interface unit coupled to the computer system and the telephone line, the method comprising the steps of:

(a) detecting as an event any of (1) a bias voltage on the telephone line to determine if the telephone is on-hook or off-hook, (2) a ringing voltage on the telephone line to determine if an external call is incoming, and (3) a first carrier having a first frequency transmitted by the phone interface unit in response to the telephone being off-hook;

(b) transmitting a second carrier using the computer interface unit under control of the computer system to control connection of the telephone to the telephone line;

(c) communicating detection of the bias voltage, ringing voltage, or first carrier to the computer system; and (d) activating a flash-hook indication on the telephone line if the line bias voltage is detected, then not detected for less than a predetermined period of time, then detected again.

2. The method of claim 1, further comprising the step of:

detecting the flash-hook indication.

3. The method of claim 2, further comprising the step of:

notifying the computer system of a flash-hook event if the flash-hook indication is detected.

4. A method of communicating information in a telephone system connected to an external phone line, the telephone system having a telephone line, a telephone, a phone interface unit coupled to the telephone and the telephone line, a computer system, and a computer interface unit coupled to the computer system and the telephone line, the method comprising the steps of:

(a) detecting as an event any of (1) a bias voltage on the telephone line to determine if the telephone is on-hook or off-hook, (2) a ringing voltage on the telephone line to determine if an external call is incoming, and (3) a first carrier having a first frequency transmitted by the phone interface unit in response to the telephone being off-hook;

(b) transmitting a second carrier using the computer interface unit under control of the computer system to control connection of the telephone to the telephone line;

(c) communicating detection of the bias voltage, ringing voltage, or first carrier to the computer system; and (d) indicating presence of the first carrier if a signal is detected having a first carrier center frequency and having an amplitude greater than a first carrier voltage.

5. The method of claim 4, wherein the first carrier center frequency is above 270 kHz.

6. The method of claim 4, wherein the first carrier frequency is about 310 kHz.

7. The method of claim 4, wherein the first carrier voltage is about 4 volts.

8. A method of communicating information in a telephone system connected to an external phone line, the telephone system having a telephone line, a telephone, a phone interface unit coupled to the telephone and the telephone line, a computer system, and a computer interface unit coupled to the computer system and the telephone line, the method comprising the steps of:

(a) detecting as an event any of (1) a bias voltage on the telephone line to determine if the telephone is on-hook or off-hook, (2) a ringing voltage on the telephone line to determine if an external call is incoming, and (3) a first carrier having a first frequency transmitted by the phone interface unit in response to the telephone being off-hook;

(b) transmitting a second carrier using the computer interface unit under control of the computer system to control connection of the telephone to the telephone line;

(c) communicating detection of the bias voltage, ringing voltage, or first carrier to the computer system; and (d) indicating presence of the second carrier if a signal is detected having a second carrier center frequency and having an amplitude greater than a second carrier voltage.

9. The method of claim 8, wherein the second carrier center frequency is above 270 kHz.

10. The method of claim 8, wherein the second carrier center frequency is about 485 kHz.

11. The method of claim 8, wherein the second carrier voltage is about 4 volts.

12. A telephone system comprising:

a telephone line for connection to an external phone line;

a telephone coupled to the telephone line;

a phone interface unit coupled to the telephone and the telephone line;

a computer system;

a computer interface unit coupled to the computer system and the telephone line;

a first detector for detecting a bias voltage on the telephone line to determine if the telephone is on-hook or off-hook;

a second detector for detecting a ringing voltage on the telephone line to determine if an external call is incoming; and a third detector for detecting a first carrier having a first frequency transmitted by the phone interface unit in response to the telephone being off-hook; and wherein the computer interface unit transmits a second carrier under control of the computer system to control connection of the telephone to the telephone line; and wherein the computer interface unit communicates detection of the bias voltage, ringing voltage, and first carrier to the computer system.

13. The telephone system of claim 12, wherein the phone interface unit has means responsive to the second carrier for isolating the telephone from the telephone line if the second carrier is transmitted.

14. The telephone system of claim 12, wherein the phone interface unit connects the telephone to the telephone line if the second carrier is not transmitted.

15. The telephone system of claim 12, wherein the computer interface unit notifies the computer system that the telephone is about to transmit voice data if the first carrier is detected.

16. The telephone system of claim 12, wherein the computer interface unit notifies the computer system that the telephone is off-hook on the telephone line if the line bias voltage is detected.

17. The telephone system of claim 12, wherein the computer interface unit notifies the computer system that the telephone is on-hook on the telephone line if the line bias voltage is not detected.

18. The telephone system of claim 12, wherein the computer interface unit notifies the computer system of an external phone call event if the ringing voltage is detected on the telephone line.

19. The telephone system of claim 12, wherein the computer system includes a flash-hook detector for activating a flash-hook indication if the line bias voltage is detected, then not detected for less than a predetermined period of time, then detected again.

20. The telephone system of claim 12, wherein the computer system is executing a communication software program, and wherein the computer system includes a device driver for translating the bias voltage into a telephony application programming interface event that is posted to the communication software program.

21. The telephone system of claim 12, wherein the computer system is executing a communication software program, and wherein the computer system includes a device driver for translating the ringing voltage into a telephony application programming interface event that is posted to the communication software program.

22. The telephone system of claim 12, wherein the computer system is executing a communication software, and wherein the computer system includes a device driver for translating the first carrier into a telephony application programming interface event that is posted to the communication software program.

23. The telephone system of claim 12, wherein the computer system is executing a communication software, and wherein the computer system includes a device driver for translating the bias voltage, ringing voltage, and first carrier into telephony application programming interface events that are posted to the communication software.

24. The telephone system of claim 12, wherein the computer interface unit is responsive to detection of the line bias voltage, indicating an off-hook condition if the line bias voltage is less than an off-hook bias voltage.

25. The method of claim 24, wherein the off-hook bias voltage is about 24 volts.

26. The telephone system of claim 12, wherein the computer interface unit indicates an incoming ring if the ringing voltage has an amplitude greater than a first voltage and a frequency in the range of a ring frequency.

27. The telephone system of claim 26, wherein the first voltage is about 50 volts and the ring frequency is about 15–68 Hz.

28. The telephone system of claim 12, wherein the first carrier is transmitted over the telephone line.

29. The telephone system of claim 28, wherein the second carrier is transmitted over the telephone line.

30. The telephone system of claim 12, wherein the computer interface unit indicates presence of the first carrier if a signal is detected having a first carrier center frequency and having an amplitude greater than a first carrier voltage.

31. The telephone system of claim 30, wherein the first carrier center frequency is above 270 kHz.

32. The telephone system of claim 30, wherein the first carrier frequency is about 310 kHz.

33. The telephone system of claim 30, wherein the first carrier voltage is about 4 volts.

34. The telephone system of claim 12, wherein the computer interface unit indicates presence of the second carrier if a signal is detected having a second carrier center frequency and having an amplitude greater than a second carrier voltage.

35. The telephone system of claim 34, wherein the second carrier center frequency is above 270 kHz.

36. The telephone system of claim 34, wherein the second carrier center frequency is about 485 kHz.

37. The telephone system of claim 34, wherein the second carrier voltage is about 4 volts.

* * * * *